US010673970B2

(12) United States Patent
Dotan-Cohen et al.

(10) Patent No.: US 10,673,970 B2
(45) Date of Patent: *Jun. 2, 2020

(54) NOTIFICATIONS OF UNADDRESSED EVENTS

(71) Applicant: Microsoft Technology Licensing, LLC, Redmond, WA (US)

(72) Inventors: Dikla Dotan-Cohen, Herzliya (IL); Assaf Avihoo, Tel Aviv (IL); Ido Priness, Herzliya (IL); Haim Somech, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,019

(22) Filed: Nov. 19, 2018

(65) Prior Publication Data

US 2019/0356750 A1 Nov. 21, 2019

Related U.S. Application Data

(63) Continuation of application No. 14/626,477, filed on Feb. 19, 2015, now Pat. No. 10,135,937.

(51) Int. Cl.
*G06F 15/16* (2006.01)
*H04L 29/08* (2006.01)
(Continued)

(52) U.S. Cl.
CPC ........... *H04L 67/26* (2013.01); *G06Q 10/109* (2013.01); *H04L 29/08693* (2013.01);
(Continued)

(58) Field of Classification Search
CPC ........ H04L 67/26; H04L 51/26; H04L 51/24; H04L 29/08693; G06Q 10/109; H04M 3/42365
(Continued)

(56) References Cited

U.S. PATENT DOCUMENTS

2003/0212646 A1* 11/2003 Horvitz ................... G06F 9/453
706/46
2004/0194110 A1* 9/2004 McKee ................... G06F 9/542
719/310
(Continued)

FOREIGN PATENT DOCUMENTS

CN 102057656 A 5/2011

OTHER PUBLICATIONS

"First Office Action and Search Report Issued in Chinese Patent Application No. 201680011114.3", dated Mar. 4, 2020, 15 Pages.

*Primary Examiner* — Liang Che A Wang
*Assistant Examiner* — Johnny B Aguiar
(74) *Attorney, Agent, or Firm* — Shook, Hardy and Bacon, L.L.P.

(57) ABSTRACT

Personalized notifications are provided to a user. The notifications correspond to events, which can include information items, unaddressed or unnoticed by a user. The unaddressed events may be determined based on sensor data provided by a user device associated with the user including user activity pattern information. Further, an urgency level of the unaddressed event and user availability for responding to the event may be determined. The availably may comprise a model with score(s) corresponding to the user's capability for carrying out tasks associated with addressing the event. Additionally, notification content may be generated based on information about availability and the unaddressed event, and used to provide notification(s). The notification content may include a recommendation to present a notification to the user at a time determined likely to be convenient for the user to be notified of the event or where the user likely has capacity to address the event appropriately.

20 Claims, 7 Drawing Sheets

(51) Int. Cl.
  *G06Q 10/10* (2012.01)
  *H04L 12/58* (2006.01)
  *H04M 3/42* (2006.01)

(52) U.S. Cl.
  CPC ............ *H04L 51/24* (2013.01); *H04L 51/26* (2013.01); *H04M 3/42365* (2013.01)

(58) Field of Classification Search
  USPC ........................................ 709/206, 207, 224
  See application file for complete search history.

(56) References Cited

U.S. PATENT DOCUMENTS

| | | | | |
|---|---|---|---|---|
| 2007/0214228 A1* | 9/2007 | Horvitz | ................ | G06Q 10/107 709/207 |
| 2011/0076989 A1* | 3/2011 | Lynch | ............... | H04M 1/72547 455/412.1 |
| 2013/0078958 A1* | 3/2013 | Kyprianou | ............ | G06Q 10/107 455/412.2 |
| 2014/0082094 A1* | 3/2014 | Bilgen | ................... | G06O 50/01 709/206 |

* cited by examiner

NOTIFICATIONS OF UNADDRESSED EVENTS

CROSS-REFERENCE TO RELATED APPLICATIONS

This application is a continuation of U.S. application Ser. No. 14/626,477, filed Feb. 19, 2015, entitled "Personalized Notifications," which is related by subject matter to commonly assigned U.S. application Ser. No. 14/626,458, now U.S. Pat. No. 9,554,356, entitled "Personalized Reminders," filed Feb. 19, 2015, both of which are hereby incorporated by reference in their entireties.

BACKGROUND

Sometimes it is inconvenient for a person to receive notifications. For example, a user may receive a notification of a missed call when it is inconvenient for the user to return the call and in so doing dismiss the notification. Later when it is convenient, the user does not remember to respond because the notification was dismissed. Moreover, because some missed communication events or other information items for which a user desires to be notified are more urgent than others, a user may desire to be reminded about those missed events or information items sooner, even when it is not as convenient to respond because of their importance. This is particularly so for missed events associated with certain contacts or other entities determined to be more important based on typical user response patterns to those entities.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the invention are directed towards systems and methods for providing personalized notification content to users regarding events associated with the user. In particular, embodiments may determine an event (such as a communication event, a task, or a news event or social media event relevant to the user) that is missed or otherwise unaddressed by a user; for example, an email from the user's boss to which the user has not replied or a user-initiated call to the user's mother that has not occurred, based on a determined user pattern of when or where the user typically calls his mother. Notification content based on the unaddressed event may be determined. The notification content may include a recommendation to present a notification to the user at a future time determined likely to be more convenient for the user to address or respond to the unaddressed event and/or where the user likely will have the capacity to react or respond appropriately, and in some cases may include providing additional content relevant to assisting the user in addressing the event. Moreover, in some cases, the formats of notifications specified by notification content (i.e., how notification(s) may be provided to the user) and the timing of the notification presentation may be based on context information associated with the unaddressed event including, for example, the importance or urgency.

Accordingly, aspects of the present disclosure relate to service content tailored to unaddressed events. The term "event" is used broadly herein to include communication events, which refers to nearly any communication received or initiated by a computing device associated with a user including attempted communications (e.g., missed calls), communication intended for the user, initiated on behalf of the user, or available for the user. The term "event" may also refer to a reminder, task, announcement, or news item (including news relevant to the user such as local or regional news, weather, traffic, or social networking/social media information). An "unaddressed event" may refer to a communication event or other event that a user has not responded to, handled, or otherwise addressed, such as a missed or uninitiated call, an unresponded-to email, unacknowledged notification or reminder, unaddressed task, unaddressed request, unaddressed social media item (e.g. a tag, tweet, newsfeed post, or similar occurrence relevant to the user), etc. By identifying unaddressed events, content such as service content can be provided to users based on the context of the unaddressed event and user behavior so as to tailor or personalize the content for the user.

As will be further described, in one embodiment, user data is received from one or more data sources. The user data may be received by collecting user data with one or more sensors or components on user device(s) associated with a user, such as described herein. Events and user responses to those events may be determined by monitoring the user data, and from this, event patterns may be determined and unaddressed events detected. Contextual information about the unaddressed event may also be determined from the user data or patterns determined from it, and may be used to determine a level of importance or urgency associated with the unaddressed event. Additionally, the user's availability for optimally addressing the event may be predicted based on the determined user patterns and/or user data sensed or otherwise collected from one or more user devices associated with the user (such as a smartphone) and in some instances from devices associated with other users.

Notification content may be generated based on the predicted availability, determined likely importance of the unaddressed event, or other contextual information, and may further include supplemental content for assisting the user in addressing the unaddressed event. Some embodiments further include using user data from other users, such as crowdsourcing data, for determining typical user response patterns to events of similar types, notification logic, and/or relevant supplemental content.

In this way, embodiments of the invention can provide notification content that is personalized to the user based on context, likelihood of user response to the notification, and having the capability to adequately address the event, so that it is easier for the user to handle the event in a manner that is timely and convenient.

BRIEF DESCRIPTION OF THE DRAWINGS

Aspects of the invention are described in detail below with reference to the attached drawing figures, wherein.

DETAILED DESCRIPTION

Figure 1:
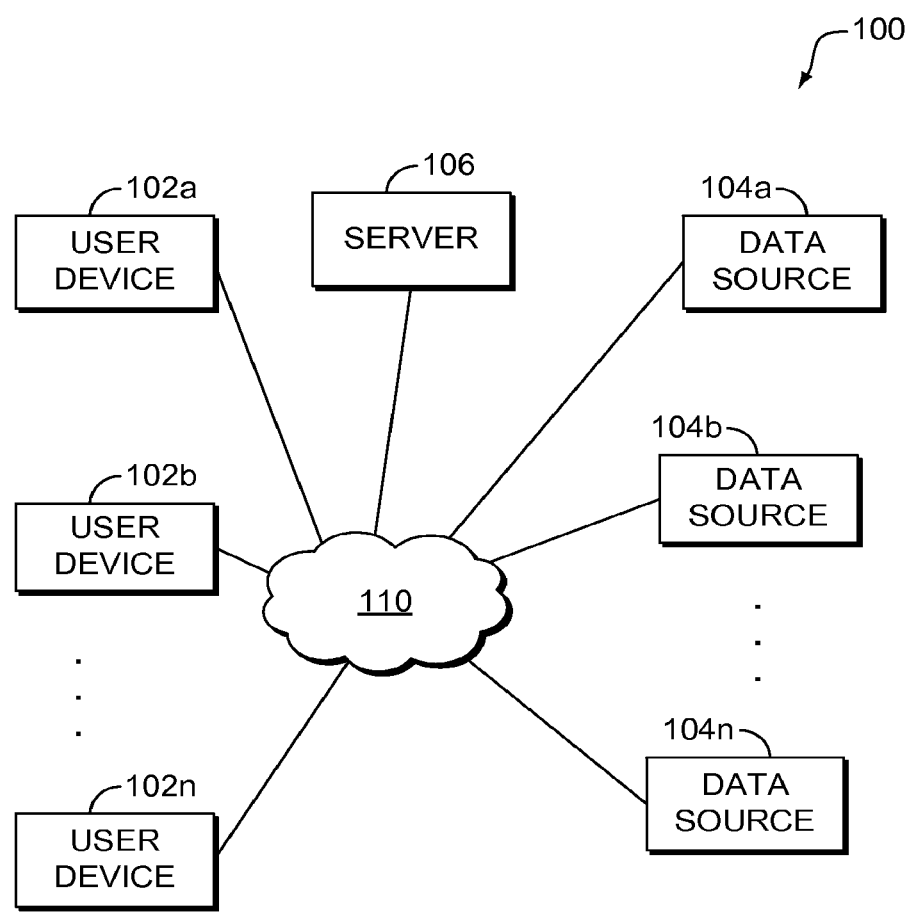
FIG. 1 is a block diagram of an example operating environment suitable for implementing aspects of the invention.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, providing personalized notification content to a user regarding an event. In particular, embodiments may determine an event that is missed or otherwise unaddressed by a user, such as an email from the user's boss to which the user has not replied or a user-initiated call to the user's mother that has not occurred, based on a determined user pattern of when or where the user typically calls his mother. Notification content based on the unaddressed event may be determined. The notification content may include a recommendation to present a notification to the user at a future time determined likely to be more convenient for the user to respond to the unaddressed event and/or where the user likely will have the capacity to respond appropriately, and in some cases may include providing additional content relevant to assisting the user in addressing the event. Moreover, the format of the notification content (i.e., how it may be provided to the user) and the timing of the notification presentation may be based on an importance or context associated with the unaddressed event. For example, the user may be reminded to call his mother the next time he picks up his phone after he leaves the office at the end of the day, while the same user may be reminded to respond to his boss's email via a visual notification presented on his smartphone following a meeting that the user was attending when the boss's email was received.

In certain respects, aspects of the present disclosure relate to service content tailored to unaddressed events. The term "event" is used broadly herein to include communication events, which refers to nearly any communication received or initiated by a computing device associated with a user including attempted communications (e.g., missed calls), communication intended for the user, initiated on behalf of the user, or available for the user. The term "event" may also refer to a reminder, task, announcement, or news item (including news relevant to the user such as local or regional news, weather, traffic, or social networking/social media information). Thus, by way of example and not limitation, events can include voice/video calls; email; SMS text messages; instant messages; notifications; social media or social networking news items or communications (e.g., tweets, Facebook posts or "likes", invitations, news feed items); news items relevant to the user; tasks that a user might address or respond to; RSS feed items; website and/or blog posts, comments, or updates; calendar events, reminders, or notifications; meeting requests or invitations; in-application communications including game notifications and messages, including those from other players; or the like. Some communication events may be associated with an entity (such as a contact or business, including in some instances the user himself or herself) or with a class of entities (such as close friends, work colleagues, boss, family, business establishments visited by the user, etc.). An "unaddressed event" may refer to a communication event or other event that a user has not responded to, handled, or otherwise addressed, such as a missed or uninitiated call, an unresponded-to email, unacknowledged notification or reminder, unaddressed task, unaddressed request, unaddressed social media item (e.g. a tag, tweet, newsfeed post, or similar occurrence relevant to the user), etc. Unaddressed events can correspond to one or more user responses or activities associated with addressing the event, such as completing or returning a call, completing a task; drafting an email, acknowledging a new item notification or social media post; scheduling an appointment, or purchasing an anniversary present, for example. By identifying unaddressed events, content such as service content can be provided to users based on the context of the unaddressed event and user behavior so as to tailor or personalize the content for the user.

Accordingly, at a high level, in one embodiment, user data is received from one or more data sources. The user data may be received by collecting user data with one or more sensors on user device(s) associated with a user, such as described herein. Examples of user data, which is further described in connection to component 214 of FIG. 2, may include location information of the user's mobile device(s), user-activity information (e.g., app usage, online activity, searches, calls), application data, contacts data, calendar and social network data, or nearly any other source of user data that may be sensed or determined by a user device or other computing device.

Events and user responses to those events may be determined by monitoring the user data, and from this, event patterns may be determined and unaddressed events detected. In some cases, an unaddressed event may be detected based on a deviation from a determined pattern of events, such as where a user calls his grandmother every Sunday but has not called her in several weeks. Contextual information about the unaddressed event may also be determined from the user data or patterns determined from it, and may be used to determine a level of importance or urgency associated with the unaddressed event. In some embodiments, contextual information may also be determined from user data of other users (i.e., crowdsourcing data). In such embodiments, the data may be de-identified or otherwise used in a manner to preserve privacy of the other users.

Additionally, the user's availability and/or capacity level to handle certain types of activities for addressing an unaddressed event (e.g., placing a call, responding to an email, browsing the web, etc.) may be predicted based on the determined user patterns and/or user data sensed from one or more user devices associated with the user (such as a smartphone) and in some instances from devices associated with other users. For example, user data, such as location, time, online activity, calendar(s), or any number of other user data, may be collected and used to determine user-availability patterns for different types of activities related to addressing an event, how that user typically responds to certain events, as well as how other users typically respond.

Notification content, including in some instances notification logic used for presenting a notification, may be generated based on the predicted availability and determined likely importance of the unaddressed event (and in some instances, other contextual information). The notification logic may specify conditions and/or times for notifying the user of the unaddressed event, as well as formats for the notification(s). The notification content may further include supplemental content for assisting the user in addressing the unaddressed event. For example, if the unaddressed event is your anniversary, supplemental information might include information about her favorite restaurant and a suggestion for making a dinner reservation at the restaurant. As such, embodiments of the invention can provide notification content that is personalized to the user based on context, a likelihood of user response to the notification, and having the capability to adequately address the event, so that it is easier for the user to handle the event in a manner that is timely and convenient.

Some embodiments of the invention further include using user data from other users (i.e., crowdsourcing data) for determining typical user response patterns to events of similar types, notification logic, and/or relevant supplemental content. Additionally, some embodiments of the invention may be carried out by a personal assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 700, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one embodiment, one or more of data sources 104a though 104n comprises one or more sensors, which may be integrated into or associated with one or more of the user device(s) 102a, 102b, or 102n or server 106. Examples of sensed user data made available by data sources 104a though 104n are described further in connection to user-data collection component 214 of FIG. 2.

Figure 2:
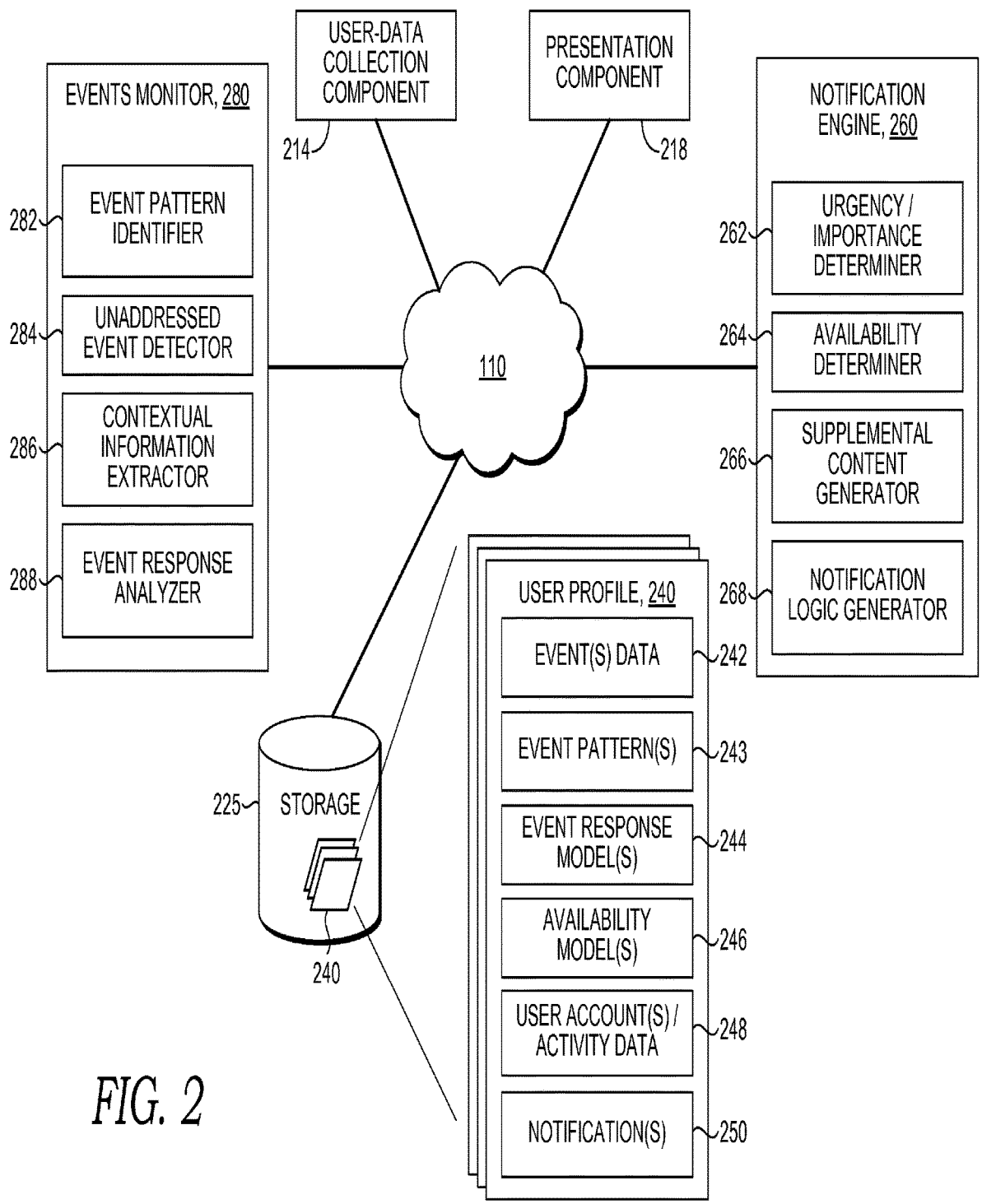
FIG. 2 is a diagram depicting an example computing architecture suitable for implementing aspects of the invention.

Operating environment 100 can be utilized to implement one or more of the components of system 200, described in FIG. 2, including components for collecting user data, monitoring events, generating notification content, and/or presenting notifications and related content to users. Referring now to FIG. 2, with FIG. 1, a block diagram is provided showing aspects of an example computing system architecture suitable for implementing an embodiment of the invention and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, events monitor 280, notification engine 260, presentation component 218, and storage 225. Events monitor 280 (including its components 282, 284, 286, and 288), notification engine 260 (including its components 262, 264, 266, and 268), user-data collection component 214, and presentation component 218 may be embodied as a set of compiled computer instructions or functions, program modules, computer software services, or an arrangement of processes carried out on one or more computer systems, such as computing device 700 described in connection to FIG. 6, for example.

In one embodiment, the functions performed by components of system 200 are associated with one or more personal assistant applications, services, or routines. In particular, such applications, services, or routines may operate on one or more user devices (such as user device 104a), servers (such as server 106), may be distributed across one or more user devices and servers, or be implemented in the cloud. Moreover, in some embodiments these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 214 is generally responsible for accessing or receiving (and in some cases also identifying) user data from one or more data sources, such as data sources 104a and 104b through 104n of FIG. 1. In some embodiments, user-data collection component 214 may be employed to facilitate the accumulation of user data of one or more users (including crowd-sourced data) for events monitor 280 and notification engine 260. The data may be received (or accessed), and optionally accumulated, reformatted and/or combined, by data collection component 214 and stored in one or more data stores such as storage 225, where it may be available to events monitor 280 and notification engine 260. For example, the user data may be stored in or associated with a user profile 240, as described herein.

User data may be received from a variety of sources where the data may be available in a variety of formats. For example, in some embodiments, user data received via user-data collection component 214 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 214 receives or accesses data continuously, periodically, or as needed.

Events monitor 280 is generally responsible for monitoring events and related information in order to determine event patterns, event response information, unaddressed events, and contextual information associated with events.

For example, as described previously, events and user responses to those events may be determined by monitoring user data (including data received from user-data collection component 214), and from this, event patterns may be determined and unaddressed events detected. In some embodiments, events monitor 280 monitors events and related information across multiple computing devices or in the cloud.

As shown in example system 200, events monitor 280 comprises an event pattern identifier 282, unaddressed event detector 284, contextual information extractor 286, and event response analyzer 288. In some embodiments, events monitor 280 and/or one or more of its subcomponents may determine interpretive data from received user data. Interpretive data corresponds to data utilized by the subcomponents of events monitor 280 to interpret user data. For example, interpretive data can be used to provide context to user data, which can support determinations or inferences made by the subcomponents. Moreover, it is contemplated that embodiments of events monitor 280 and its subcomponents may use user data and/or user data in combination with interpretive data for carrying out the objectives of the subcomponents described herein.

Event pattern identifier 282, in general, is responsible for determining event patterns. In some embodiments, event patterns may be determined by monitoring one or more variables related to events or user responses to those events. These monitored variables may be determined from the user data described in connection to user-data collection component 214 (for example: location, time/day, the initiator(s) or recipient(s) of a communication, the communication type (e.g., call, email, text, etc.), user device data, etc.). In particular, the variables may be determined from contextual data related to events, which may be extracted from the user data by contextual information extractor 286, as described herein. Thus, the variables can represent context similarities among multiple events. In this way, patterns may be identified by detecting variables in common over multiple events. More specifically, variables associated with a first event may be correlated with variables of a second event to identify in-common variables for determining a likely pattern. For example, where a first event comprises a user-initiated call to a contact identified as "mom" on Saturday and a second event comprises a user-initiated call to the same contact ("mom") on the following Saturday, a pattern may be determined that the user calls "mom" on Saturday. In this case, the in-common variables for the two events include the same contact-entity (mom), the same day (Saturday), that the communication was user-initiated, the same recipient of the communication (mom), and the same type or mode of communication (a call).

An identified pattern becomes stronger (i.e., more likely or more predictable) the more often the event instances that make up the pattern are repeated. Similarly, specific variables can become more strongly associated with a pattern as they are repeated. For example, suppose every day after 5 pm (after work) and while driving, a user calls someone in the same group of contacts (which could be her family members). While the specific person called varies (i.e., the contact-entity that the user calls), an event pattern exists because the user repeatedly calls someone in this group.

Event patterns do not necessarily include the same communication modes. For instance, one pattern may be that a user calls or emails his mom every Saturday. Moreover, in some instances, events pattern may evolve, such as where the user who calls his mom every Saturday starts to email his mom instead of calling her on some Saturdays, in which case the pattern becomes the user communicating with his mom on Saturdays. Event patterns may include event-related routines; typical user activity associated with events, or repeated event-related user activity that is associated with at least one in-common variable. For example, a particular user has a pattern of calling while driving but only after 5:30 pm or when the drive lasts longer than 10 minutes. Or a user is likely to browse the Internet and respond to personal email between 7:00 and 9:30 PM, but rarely after 9:30 PM. Further, in some embodiments, event patterns can include user response patterns to events, which may be determined from event response analyzer 288, described below.

Event response analyzer 288, in general, is responsible for determining response information for the monitored events, including unaddressed events, such as how users respond to particular events and event response patterns. Response information is determined by analyzing user data (received from user-data collection component 214) corresponding to events and user activity that occurs after a user becomes aware of an event, including after the user becomes aware of an unaddressed event (such as a missed call). In some embodiments, event response analyzer 288 receives data from presentation component 218, which may include a user action corresponding to a monitored event to which the user has become aware, and/or receives contextual information about the monitored events from contextual information extractor 286. Event response analyzer 288 analyzes this information in conjunction with the monitored event and determines a set of response information for the event. Based on response information determined over multiple events, event response analyzer 288 can determine response patterns of particular users for certain events, based on contextual information associated with the event. For example, where monitored events include incoming emails from a user's boss, event response analyzer 288 may determine that the user responds to the email at the first available opportunity after the user becomes aware of the email. But where the monitored event includes a missed call from the user's wife, event response analyzer 288 may determine that the user typically returns her calls between 12 pm and 1 pm (i.e., at lunch) or after 5:30 pm (i.e., after work). Similarly, event response analyzer 288 may determine that a user responds to certain events (which may be determined by contextual information extractor 286 based on variables associated with the events) only under certain conditions, such as when the user is at home, at work, in the car, in front of a computer, etc. In this way, event response analyzer 288 determines response information that includes user response patterns for particular events. The determined response patterns of a user may be stored in event response model(s) component 244 of a user profile 240 associated with the user, and may be used by notification engine 260 for providing notification content to the user.

In an embodiment, this response information determined by event response analyzer 288 is provided to notification engine 260, which uses the response information in preparing notification content for a user. For example, as further described below, availability determiner 264 may use the response information to determine user capability levels needed to address particular types of events, such as that addressing a first type of event likely requires the user to read documents on his computer and thus user availability is dependent on the user's access to a computing device with a display. However, a second type of event may be addressable by a phone call, and thus user availability is dependent on the user's capability to make a phone call, which could occur if it is determined that the user is driving but could not occur if it is determined that the user is in a meeting, for example.

Further, in some embodiments, event response analyzer 288 determines response information using crowdsourcing data or data from multiple users, which can be used for determining likely response patterns for a particular user based on the premise that the particular user will react similar to other users. For example, a user pattern may be determined based on determinations that other users are more likely to call their friends and family members in the evenings but are less likely to call these same entities during the day while at work. Similarly, a user pattern may be determined based on determinations that other users typically call their spouse back at a soonest convenient time, but call their boss back as soon as possible even if it is inconvenient. Moreover, in some embodiments, contextual information extractor 286 provides contextual information corresponding to similar events from other users, which may be used by event response analyzer 288 to determine responses undertaken by those users. Other users with similar events may be identified by determining context similarities, such as variables in the events of the other users that are in common with variables of the events of the particular user. For example, in-common variables could include the relationships between the parties (e.g., the relationship between the user and the recipient or initiator of a communication event), location, time, day, mode of communication, or any of the other variables described previously. Accordingly, event response analyzer component 288 can learn response patterns typical of a population of users based on crowd-sourced user information (e.g., user history, user activity following (and in some embodiments preceding) an associated event, relationship with contact-entities, and other contextual information) received from multiple users with similar events. Thus, from the response information, it may be determined what are the typical responses undertaken when an event having certain characteristics (e.g., context features or variables) occurs.

Moreover, most users behave or react differently to different contacts or entities. Events may be associated with an entity, with a class of entities (e.g., close friends, work colleagues, boss, family, businesses frequented by the user such as a bank, etc.). Using contextual information provided by contextual information extractor 286 (described below), event response analyzer 288 may infer user response information for a user based on how that user responded to similar classes of entities, or how other users responded in similar circumstances (such as where in-common variables are present). Thus, for example, where a particular user receives a missed call from a new manager and has never responded to that manager before, event response analyzer 288 can consider how that user has previously responded to his other managers or how the user's colleagues (as other users in similar circumstances) have responded to that same manager or other managers.

Unaddressed event detector 284, in general, is responsible for detecting unaddressed events such as events that may require a user response or action, or events that a user may desire responding to. Examples of unaddressed events include, by way of example and not limitation, a missed or unaddressed communication received by a computing device associated with a user, such as a missed call or unresponded-to email; a missed instance of an event in an event pattern associated with the user, such as where the user calls his grandmother every Sunday, but did not call her on the previous Sunday; an upcoming event requiring user action, such as an upcoming anniversary indicated on the user's calendar, car insurance renewal, or a coupon or offer that will expire; a news item, information item, or notification (including social media news item, post, tweet, tag, etc.) relevant to the user which the user has not acknowledged; or a request or task that has not been responded to, handled, or otherwise addressed by the user, including reminders set by the user (for example, a user speaking into his mobile device "Cortana, remind me to fix the leaky faucet."); or other events that a user has not responded to, handled, or otherwise addressed, such as other unaddressed events described herein.

Unaddressed event detector 284 may detect pending unaddressed events based on events detected by events monitor 280, information from user data collected from user-data collection component 214, and response information from event response analyzer 288. For example, an instance of an unaddressed event may be detected where a monitored event occurs and a user has not responded, or where a monitored event will occur in the near future and an analysis of user activity, by event response analyzer 288, indicates that the user likely has not undertaken activity associated with the event, such as where user data (and in particular user-activity information) does not include context features corresponding to the monitored event. The unaddressed event information may be provided to notification engine 260.

In some embodiments, unaddressed events detector 284 uses information from user account(s)/activity data 248 for monitoring social network activity related to a user. Unaddressed events detector 284 may also monitor user activity in response to events detected by events monitor 280, including news or information items relevant to the user, which may be detected from other data sources, such as data source 104a-104n (FIG. 1). In so doing, some embodiments of unaddressed events detector 284 determine that a user likely has not addressed, or likely has not been made aware, of a detected event, based on the user activity. For example, where user activity indicates that a user has not accessed a social media account, or where a user (or other users) typically responds to or reacts to a similar news item, information item, or other event with certain pattern of user activity, but such user activity has not been detected by unaddressed events detector 284, then it may be determined that the user likely has not addressed and/or been made aware of the detected event.

In some embodiments, unaddressed event detector 284 identifies triggering circumstances likely indicative of an unaddressed event. For example, an incoming call not answered, an email not responded to or not even presented to the user via a user interface, or a user pattern not maintained. One or more detected trigger circumstances may provoke unaddressed event detector 284 to determine if an unaddressed event is pending, so that notification engine 260 can determine a recommended course of action for addressing the unaddressed event.

In one embodiment, unaddressed event detector 284 considers typical user response patterns for similar events, which may be provided via response information determined by event response analyzer 288. The user response patterns may be compared to current or recent user-activity data in order to determine whether the user has (or is) likely responded to a particular event. For example, where the user's calendar indicates that his anniversary is next week (a potentially unaddressed event) and user data, such as the user's email or website user history indicates that the user likely made a reservation at restaurant on the date of the anniversary, then it may be determined that the user has likely addressed the event and thus notification engine 260 does not need to prepare a reminder. Although, in some embodiments, a notification may be presented to the user regarding the event (the upcoming anniversary) nevertheless, depending on the likelihood that the user has addressed the event as determined from the user data, especially recent user activity.

As another example, suppose an email is received on an account associated with a user and contextual information associated with the email indicates that it is from the user's boss and contains numerous keywords likely indicative of urgency. User data indicates that the user accessed his email, was presented with the email on a user device (in other words, the user likely has read the email from his boss), but the user has not replied to the email. But user data also indicates that the user called his boss (from his smartphone) after accessing the email. Then it may be determined that the user has likely addressed the event and does not need to be reminded to respond to his boss's email.

As yet another example, suppose a triggering circumstance indicates a missed call, and contextual information associated with the call indicates that the user's wife called. But user data indicates that the user has not placed a call to his wife since the missed call, nor has he emailed or texted his wife since the missed call. Thus, unaddressed event detector 284 detects a likely unaddressed event; namely the missed call from the user's wife. Now, suppose further that the user was not at the same location as his wife when the missed call occurred (location may be determined from a user device associated with the user, such as a smartphone), but now the user's location and the wife's location are the same; for example, both are at presently located at home. Then it may be determined less likely that the potential unaddressed event (the missed call) is pending because the user and his wife are at home together and presumably communicating with each other. Thus, it is likely that the event has been addressed.

As yet another example, suppose an event pattern indicates that a user calls his grandmother every Sunday. But user data (such as the user's calendar and email) indicates that the user will be traveling out of the country next Sunday. Therefore, there exists a likelihood of a future unaddressed event. In some embodiments, unaddressed event detector 284 may determine that an unaddressed event is likely to occur and, similar to the examples described above, consider recent user-activity data in order to determine whether the user has (or is) likely responded to the unaddressed event. For example, if the user called his grandmother on Friday instead, then it may be determined that the user has addressed the event.

In still other examples, suppose an event pattern indicates that a user typically likes or comments on social media posts from a particular entity, shares social media posts from a particular entity. User data collected from user-data collection component 214 indicates that the particular entity has posted a news item on social media, but response information from event response analyzer 288 determines that the user has not yet responded to this item. Therefore unaddressed event detector 284 detects a likely unaddressed event based on the user not following his typical pattern of responding to social media activity or the particular entity. Alternatively, suppose user data collected from user-data collection component 214 indicates that many or even a majority of the user's social networking contacts are responding to an information item (such as a news item, post, trending story, etc.). But response information from event response analyzer 288 determines that the user has not yet acknowledged or responded to this item or may not even know about it. Unaddressed event detector 284 may determine this be an unaddressed event corresponding to the information item. In some embodiments, unaddressed event detector 284 may base the determination on user patterns or user history information, such as how often the user responds to information items in previous situations. Furthermore, other contextual information extracted from the information item may be used to determine a level or urgency or importance of the information item to the user, which may be used for providing a notification to the user as further described herein.

Contextual information extractor 286, in general, is responsible for determining contextual information associated with the events monitored by events monitor 280, such as context features or variables associated with events and user-related activity. Contextual information may be determined from the user data of one or more users provided by user-data collection component 214. For example, contextual information extractor 286 receives user data, parses the data, in some instances, and identifies and extracts context features or variables. In some embodiments, variables are stored as a related set of contextual information associated with an event, response, or user activity within a time interval following an event (which may be indicative of a user response).

In particular, some embodiments of contextual information extractor 286 determine contextual information related to an event, contact-entity (or entities, such as in the case of a group email), user activity surrounding the event, and current user activity. By way of example and not limitation, this may include context features such as location data; time, day, and/or date; number and/or frequency of communications; keywords in the communication (which may be used for determining importance or urgency); contextual information about the contacting entity (such as the entity identity, relation with the user, location of the contacting entity if determinable, frequency or level of previous contact with the user); history information including patterns and history with the contact-entity; mode or type of communication(s); what user activity the user engages in when an event occurs or when likely responding to an event, as well as when, where, and how long the user engages in activity associated with the event or a likely response to an unaddressed event; or any other variables determinable from the user data, including user data from other users. Other examples of contextual information include confidence scores, variance scores, and other information generated in identifying an unaddressed event or user response to an event.

As described above, the contextual information may be provided to: event pattern identifier 282 for determining patterns (such as event patterns using in-common variables); unaddressed event detector 284 for determining whether an unaddressed event is still pending, the extent of action or response a user has undertaken to address an unaddressed event, or that responding to the unaddressed event is no longer relevant (such as in the example where the user and his wife are both at home and thus the user does not need to return his wife's call); and event response analyzer 288 for determining response patterns (including response patterns of other users). In particular, contextual information provided to event response analyzer 288 may be used for determining information about user response patterns, user-activities that may correspond to responding to an unaddressed event, how long a user engages in responding to the unaddressed event, modes of communication, or other information for determining user capabilities desired for addressing certain types of events, which may be used for determining user availability to respond to an unaddressed event. Additionally, contextual information may be provided to notification engine 260 and used for determining urgency or importance of a missed event, availability of the user for handling an unaddressed event, supplemental content for assisting the user in addressing the unaddressed event, and logic for presenting a notification to a user, such as when, where, or how to present notification content.

Continuing with FIG. 2, notification engine 260 is generally responsible for generating and providing notification content regarding an event where it may be provided to the user as a personalized notification. In one embodiment, the notification content includes a notification, which may be in the form of a recommended action for the user to address an unaddressed event, and may further include supplemental content for assisting the user in addressing the event. In some cases, the notification content includes notification logic specifying conditions for presenting the notification based on user data, such as time(s), location(s), mode(s), or other parameters relating to presenting a notification from the notification content.

For example, notification content may include a notification to the user to return a call from his wife with logic that specifies the notification may be presented to the user when user data indicates that the user has started his car to drive home from work at the end of the workday, or that the notification is presented to the user in a pop-up window upon the next instance of user data indicating that the user is launching the phone app on his smartphone. The notification may present a text or audio query asking the user "do you want to call your wife now?" Based on an affirmative response from the user (e.g., saying "yes" or touching a "yes" button on his mobile device), the user's wife is automatically called, without the user having to provide the phone number. Continuing this example, the notification content may include supplemental content, such as reminding the user that his wife is boarding a flight in 45 minutes and that this will be his only opportunity to call her before she departs.

In some embodiments, notification engine 260 generates a notification to be presented to a user, which may be provided to presentation component 218. Alternatively, in other embodiments, notification engine 260 generates notification content and makes it available to presentation component 218, which determines when and how (i.e., what format) to present the notification based on notification logic in the notification content and user data applied to the notification logic. In some embodiments, a notifications service or application operating in conjunction with presentation component 218 determines or facilitates determining when and how to present the notification. Pending notifications associated with a user may be stored in a user profile 240, such as in a notification(s) component 250. Further, in some embodiments, notification engine 260, presentation component 218, and/or a notifications service or application manages pending notifications for a user and may prioritize which notifications are presented, such as described below.

As described previously, notification engine 260 may receive information from user-data collection component 214 and/or events monitor 280 (which may be stored in a user profile 240 that is associated with the user) including event data; current user information, such as user activity; unaddressed event data, which may also include a determined likelihood that the event is unaddressed; contextual information; response information determined from event response analyzer 288 (including in some instances how other users respond or react to similar events); event pattern information, user availability models, or availability pattern information; or information from other components or sources used for creating notification content. In one embodiment, using the received information described above, notification engine 260 determines an importance or urgency associated with an unaddressed event and determines user availability for addressing the event (described further below), which may be determined based on the urgency or importance and may vary based on the user's capability for addressing an event. Notification engine 260 may also generate supplemental content and notification logic, which may be based on the determined availability, urgency, and context associated with the unaddressed event or its response. In this way, embodiments of the invention may provide notification content that is able to be personalized to the user based on context, a likelihood of user response to the notification, and having the capability to adequately address the event, so that it is easier for the user to handle the event in a manner that is timely and convenient.

As shown in example system 200, notification engine 260 comprises urgency/importance determiner 262, availability determiner 264, supplemental content generator 266, and notification logic generator 268. Urgency/importance determiner 262, in general, is responsible for determining an importance level and/or urgency level for an unaddressed event. An importance level can indicate how important or imperative it is that a user addresses an event, while an urgency level may indicate how soon the event should be addressed. Some embodiments of notification engine 260 may determine urgency, importance, or both. Moreover, an unaddressed event may become more urgent as a deadline approaches (such as the anniversary example described previously), and the importance level and/or urgency level may be updated based on changes detected in contextual information, current user data, the user's response, newly detected user patterns, or new unaddressed events that are determined to be related to an already outstanding event. For example, a missed call from a boss following an unresponded-to email may indicate a higher urgency level for responding to the email.

In some embodiments, urgency/importance determiner 262 determines an urgency level and/or importance level (which may be embodied as a score or numerical value) using information about the unaddressed event, which may be received from unaddressed event detector 284, along with user data received (from user-data collection component 214) or contextual information (provided by contextual information extractor 286), or other data provided by events monitor 280, user profile 240, or presentation component 218. For example, urgency/importance determiner 262 may consider similar unaddressed events and their frequency (such as repeated missed calls or an unresponded-to email and missed call from the same contact); previous responses to similar events (from event response analyzer 288) from the user or other users, which may indicate a level of importance or urgency, based on how soon after the similar unaddressed event occurred the user(s) responded; or pattern information such as whether the unaddressed event is associated with a pattern or whether it is unexpected. For example, where mom usually calls every Sunday, an unaddressed event corresponding to where the user missed answering a call from mom on a particular Sunday may be determined to have less importance than a missed call from mom that occurs in the middle of the work day or in the middle of the night (i.e., mom is calling at an unusual time that doesn't follow patterns associated with when she usually calls). Urgency/importance determiner 262 may also or alternatively consider location information, time of day, and other contextual information (for example, a higher level of importance and urgency may be determined where the user's wife called from the hospital or the user's mom called during the middle of the night); user settings or preferences regarding the importance or urgency of addressing certain events, or events that are associated with certain variables, which may be explicitly specified by the user or learned (e.g., an importance level assigned to communications from a boss or all communications from close friends); and the user's relation to the contact-entity (for example, is this an acquaintance, a close friend, family member, co-worker, boss, etc.), which may include how the user has identified this entity in a contacts roster or social media account and/or the user's history for communicating with this contact and level of contact with the entity. For example, a missed call from a user's friend may be determined to be more important than a missed call from a salesman who has no previous contact with the user.

In some embodiments, the urgency level or importance level may be determined from contextual information based on context features associated with the unaddressed event (including extracted keywords or other context features extracted from similar events). In particular, as described previously, keywords and other context features may be extracted by contextual information extractor 286 and used by event response analyzer 288 to determine information about user responses for one or more users, such as information about how users typically respond (including how quickly they respond), based on certain keywords or other context features associated with the event. Additionally some keywords may be predetermined to indicate possible urgency (such as "urgent," "immediate," or similar words that may be present in communications).

In some embodiments, using the received information described in the preceding two paragraphs, a degree of urgency or importance may be determined for an unaddressed event and used for determining a value representing the level of urgency or importance. For example, in an embodiment, the level of importance or urgency for an event may be determined relative to previous responses of the user or similar responses of other users, including handling unaddressed events previously determined to be urgent or important or previously determined to be unimportant or not urgent. In this way, the determined level may span a range (such as 1 to 10 or "Not Urgent" to "Extremely Urgent," for example) based on a comparison to similar events and the extremes (urgent/important events and not urgent/important events) and how those events were handled. Further, in some embodiments, one or more thresholds may be applied for determining whether the determined urgency level value or importance level value is sufficient enough to result in presenting a notification associated with the unaddressed event. For example, a user may desire not to be bothered by notifications corresponding to unaddressed events having low importance (such as a missed call from a random salesman) Thus, in some embodiments, when the importance level is low, no action may be required in response to identifying an out-of-routine event. Moreover, the threshold values may vary based on the context and notification content, such as the recommended response for the user to address the unaddressed event. For example, if it is the middle of the night (determined from contextual information), the threshold for importance to merit presenting a user with a notification may be higher than if it is in the middle of the day and the user is otherwise available. Additionally, different actions may be taken, or may be recommended to be taken, for addressing an unaddressed event, based on different importance levels. In embodiments, using urgency or importance thresholds, the thresholds may be determined based on predetermined rules, user history, data from other users, or user preferences or settings, such as further described below.

In some embodiments, an urgency level or importance level has an associated probability or confidence indicating a likelihood of the determined urgency or importance. The confidence may be determined based on the amount of contextual information potentially indicating urgency or importance and/or the magnitude (or weight) associated with specific pieces of contextual information. (For example, an email from the user's boss that is designated as a "high importance" message would have more weight than an email from the boss with normal importance.) In some embodiments, the confidence may be used for prioritizing notifications presented to a user. For example, where two or more notifications share a similar urgency or importance, the one that has a higher confidence may take priority (e.g., may be shown first or sooner) over the others.

Embodiments of notification engine 260 may use the importance level and/or urgency level for determining availability of a user for addressing an unaddressed event, such as relevant and optimal times for responding to an unaddressed event. A user's availability may change based on the importance and urgency of an unaddressed event. For example, an otherwise unavailable user may be determined available for a very urgent and important event (such as a missed call from his wife indicating that she is going into labor and en route to the hospital), but remain unavailable for an unaddressed event that is not urgent or importance (such as a missed call from a random salesman).

Availability determiner 264, in general, is responsible for determining user availability for addressing unaddressed events, including, in some embodiments, current availability and/or future availability (or forecasted availability). In particular, some embodiments of availability determiner 264 infer or predict a user's availability for handling unaddressed events at future time intervals, based on user data and information provided by events monitor 280, as further described below. The determined user availability information, which may be represented as a set of availability score(s), may be based in part on a user's capacity or capability for carrying out actions associated with addressing an unaddressed event. Further, the availability information may be represented by one or more availability models, which may be stored in a user profile 240 associated with the user, in some embodiments. For example, it may be determined that a user commutes every weekday from 8:00 to 8:30 AM and thus does not have the capability for replying to email during this time, but is available for making phone calls. After 8:30 AM, however, the user is likely to be in her office and logging on to her computer and thus is available for email as well as tasks that may involve accessing webpages, reading documents, typing, or other actions at a computer. On a particular day, where traffic data indicates an accident and the user's commute is extended, then the forecasted availability information of the user (such as an availability model, in some embodiments) may be adjusted to account for the additional time spent in the commute.

The determined user availability information, which may be referred to as an availability schedule, may be used for providing notification content to the user. For example, the availability, urgency, and/or importance may be used for determining logic and other parameters associated with providing notification content to a user, such as where or when to provide notification(s); how or in what format(s) (e.g., as an alarm, pop-up, notification bug, spoken suggestion, etc.), or with what look(s) or characteristics the notification content should be provided; and what should the notification content include (including how much content should be included and how much supplemental content should be included). For example, a user who is driving should likely be presented with less content than a user who is accessing a laptop computer. In this way, a user may be presented with notification content at a time (or times, or time windows) determined likely to be opportune for the user to respond to the unaddressed event and/or where the user likely will have the capacity to respond appropriately, based on the importance or urgency of the event. In some embodiments, the inferred availability information may represent an optimal time(s) when a user is most likely to choose to (or want to) respond to the unaddressed event, which is determined based on user patterns, response information, contextual information, and/or other user data as described herein. For example, it may be determined that a user will respond to a certain type of event when the user is at home up to 8:00 PM but not later; or that a particular user does not respond to events between 6:00 and 7:00 PM (which may correspond to when that user is eating supper).

In some cases, addressing an unaddressed event may involve different levels of user capacity corresponding to different ways of addressing the event (such as different communication types like email or phone) or different tasks to be completed where a series of actions is needed to address an event. (The different ways of handling unaddressed events and series of actions may be provided by response information from event response analyzer 288.) For example, where the unaddressed event is a user's upcoming anniversary, the user may be able to make a reservation at a restaurant over the phone or online at the restaurant's website. Moreover, handling some unaddressed events may require multiple actions of the user, such as, using the previous example, the tasks of first determining which restaurants that serve cuisine that the user's wife likes, then which of those restaurants are available on the anniversary, determining a time frame when the user and his wife are available for dinner, and finally, making the reservation at one of the restaurants. Accordingly, in some embodiments, user availability information reflects a user's capability for handling various activities to complete the tasks. For example, while driving, a user's availably information may be low for email (or indicate that a user is not available for email) and low for reading documents or browsing the Internet, but high for initiating phone calls, since the user can call while driving. In some such embodiments, the availability information may be represented as a matrix indicating a set of availably scores corresponding to different activity or communication types, such as calling, emailing, browsing the Internet, reading documents, typing or signing, being present at a particular location, etc.

User availability information may be determined from user patterns (including patterns from other users) based on previous responses to events, contextual information, and other user data including current user data. For example, a calendar or social network profile associated with the user may be evaluated to identify activity related to the user, such as a baseball game activity identified from a social network post and message between the user and another user. In another example, availability information may be determined in part from contextual features associated with a user device (e.g., a device location, a device time, a mode of transportation, a device location check-in, an alarm, a charging state, a connectivity state, or user data stored on the device), such as a video game console pre-order receipt stored on the device may be evaluated to identify a video game console release pick-up activity. In a further example, the user signal may comprise temporal information, locational information, and/or a wide variety of information that may be used to identify an activity (e.g., recurring) based upon the user signal (e.g., the device may have a location corresponding to a breakfast restaurant on Saturdays, which may indicate the user has a routine of eating breakfast at the breakfast restaurant on Saturdays).

In still another example, user availability may be determined using calendar information from one or more user calendars, such as office calendars, personal calendars, social media calendars, or even calendars from family members or friends of the user, in some instances. Some embodiments of the invention may construct a complementary or shadow calendar for a user, for use in determining availability. In particular, in such embodiments, the complementary or shadow calendar maybe used for creating an availability model of the user.

In an embodiment, the complementary calendar may be constructed based upon sensor data associated with a user of a device. For example, a social network profile (e.g., social network posts, social network messages, a user profile indicating hobbies or interest of the users, etc.) may be evaluated to identify an activity of the user as a particular sensor data. In another example, a context of the user's device may be evaluated to identify an activity of the user as the sensor data (e.g., a device location may be indicative of the user going to soccer practice at a soccer field on Tuesdays; a device location check-in may be indicative of the user going out on a movie date on Sundays (e.g., the user may check-in through a social network); a connectivity state, such as Wi-Fi connectivity, may indicate that the user is at home, in the office, or at a coffee shop; a charging state, such as a car charging state, may indicate that the user is currently driving; a vacation itinerary file on the device may indicate that the user will be going on a vacation in a week; etc.).

It may be appreciated that, in some embodiments, a wide variety of information, such as temporal information and/or locational information, may be evaluated to identify sensor data and/or supplement sensor data (e.g., a user's primary calendar may be used to identify conflicts and/or verify activities derived from sensor data; sensor data may be evaluated against real-time data. such as traffic information, weather, or supplemental information, which may include information from the user's social media accounts, family or friends social media accounts, email, news, and other user data (e.g. crowd-sourced data). In this way, the complementary calendar may be constructed with one or more entries derived from sensor data (e.g., automatically generated entries based upon inferred activities). In an embodiment, a complementary calendar may be merged with one or more calendars (e.g., the user's primary calendar, a family calendar, a social network calendar, etc.) to create a shadow calendar comprising at least some of the complementary calendar (e.g., automatically generated entries derived/inferred from sensor data) and at least some of the one or more calendars (e.g., user entries populated within the primary calendar by the user). Scheduling conflicts may be identified based upon the complementary calendar and/or the shadow calendar (e.g., a user entry may indicate that the user has a 9:00-9:30 Monday work meeting and an entry within the complementary calendar may indicate that the user is to meet his a friend for coffee at 9:15 on Monday based upon a social network post).

The availability information may be updated as the user data or contextual information changes, as described in the previous example. In one embodiment, a likelihood is determined that a user will follow one or more user patterns, based on user data (e.g., calendar information, meeting requests, social network feeds, location data, etc.), information from events monitor 280, and/or previously determined user pattern(s), such as the user commuting to work between 8:00 and 8:30 AM on weekdays (which may be determined from location and motion information for the user's phone, data from the user's vehicle, data showing that the user regularly signs into an account on another commuting device (i.e., the user's work computer) shortly after 8:30 AM on weekdays, or other similar user data). User capability associated with these patterns may be determined based on the user's (or other users') activity detected from previous instances of patterns (e.g., the user has previously initiated phone calls during his commute; therefore, the user is likely available for phone communicating); rules such as documents cannot be read while driving or if the road is icy then the driving user's availability for phone communication is lower (The user needs to pay attention to the road.); and user settings or preferences (further described below). The availability information may be represented in one or more user availability models. Further, in some embodiments, one or more machine learning algorithms are used to determine the availability information (or update the availability models), such as further described below.

Supplemental content generator 266, in general, is responsible for determining supplemental content for assisting the user in addressing the unaddressed event. As described previously, notification content used to provide notifications to a user regarding unaddressed events may include supplemental content, in some embodiments. Supplemental content may include helpful information, such as relevant contextual information (e.g., in the example of a user making a reservation for his anniversary, supplemental content might include that it is the user's $10^{th}$ anniversary, that in a previous email the user's wife mentioned that she wanted to try out a particular restaurant, etc.); information from other data sources (such as content from websites or links to content useful for the user, such as a link to a website for making restaurant reservations); hints or tips, which may be based on information derived from other users' responses to similar events; recommendations or suggestions; and/or the actions or steps needed to be taken by the user in order address the event.

In some instances, supplemental content may also include information about actions already taken by the user towards completing the unaddressed event and/or what steps remain to be completed, for example, where a user has started researching restaurants for making a reservation but has not made a reservation yet, or where a user has started drafting an email in response to an email from her boss but has not finished or sent her email. Further, in some embodiments, supplemental content may include actions already taken by a personal assistant application for assisting the user in handling the unaddressed event. For example, in some embodiments, a personal assistant application (or similar service) may automatically make a dinner reservation for the user's anniversary and provide supplemental content informing the user of the reservation or asking the user to confirm that the user desires to complete the reservation.

Similarly, using embodiments of the invention, in completing actions towards addressing an unaddressed event, a personal assistant application may reserve tickets, order lunch or coffee, obtain quotes, compare prices, schedule appointments, or similar activities, and may provide (as supplemental content) information about the action(s) undertaken by the personal assistant application. (In some cases, a user may provide authorization for a personal assistant application or service to carry out activity such as the previous example, including making purchases.)

The supplemental content may be prioritized or ranked based on its relevance to handling the unaddressed event. In this way, the quantity of supplemental content made available to a user may be based on the user's availability (as determined by availability determiner 264). Alternatively or in addition, the supplemental content may be associated with various options (e.g., alternative actions and/or communication types) for handling the unaddressed event, such as supplemental content for making a call, which could include relevant phone numbers, store hours, etc., versus supplemental content for preparing an email, which could include links to relevant websites. For example, where the user is driving and the unaddressed event includes the user's upcoming anniversary, supplemental content could include the phone number to one or more restaurants for making a dinner reservation and a request asking if the user wants to make a reservation now. But for the same unaddressed event, where the user in the office, the supplemental content could include links to one or more restaurant websites for making a reservation.

In some embodiments, the supplemental content may be determined based on a semantic understanding, using keyword and pattern analysis, of contextual information of the unaddressed event and response information from the user's previous responses or from other users responding to similar events, which can include user activity history (e.g., browsing history, actions taken, etc.) of other users responding to similar events. Further, in some embodiments, supplemental content may be determined in a manner similar to search engine results where context features associated with the unaddressed event are queried and the results used for determining or providing supplemental content. Supplemental content may also be determined from rules based the specific types of unaddressed events and/or the actions needed to handle the unaddressed event, for example, rules for providing relevant links, phone numbers, store hours, contextual background, or previous user activity undertaken that is determined likely to be relevant to the unaddressed event, or other rules for providing the content described herein with regards to supplemental content.

Notification logic generator 268, in general, is responsible for determining logic for presenting notification content to users, such as when or how to present the notification content. As described previously, notification content used to provide notifications to a user regarding unaddressed events may include notification logic, in some embodiments. Notification logic may specify rules, conditions, constraints, times (including future times or time windows), and/or other parameters for notifying the user of unaddressed events, and the content to be included in the notifications, as well as logic specifying or recommending formats for presenting notification(s). In some embodiments, notification logic may be determined from user preferences or determined patterns, as described below, such as logic specifying not to present a notification in the middle of the night, unless the importance exceeds a user-specified level, or logic specifying not to present a notification between 6:00-7:00 PM because the user will not respond during this time (perhaps because the user is eating supper).

The notification logic may be generated based on the determined availability, which may include one or more user availability models; the determined urgency or importance of the unaddressed event; and other user data, such as current user information or contextual information. In one embodiment, notification logic is generated for each unaddressed event. In another embodiment, the same or similar notification logic is included in the notification content corresponding to unaddressed events of a certain category or class (such as a missed email) In one embodiment, notification logic includes priority information such that where more than one unaddressed events are pending, notifications can be prioritized based on importance or urgency and user availability for addressing the unaddressed event. In this way, notifications provided to the user can be managed (such as by presentation component 218 or another application or service) so that a user isn't overwhelmed by outstanding unaddressed events.

For example, in one embodiment the importance or urgency of unaddressed events may be used for ranking or otherwise prioritizing pending or potential notifications that correspond to those unaddressed events. Information indicating the determined priority or ranking may be included in the notification logic. Moreover, in an embodiment, based on the notification logic, pending or potential notifications may be scored relative to other pending or potential notifications based on the importance or urgency of their corresponding unaddressed events. For example, in an embodiment the score may comprise a weighted rank of each notification, which may be scored on the same scale and used for assigning a priority. In some embodiments, the pending or potential notifications may be logically organized in queue based on a weighted ranking or score. Further, upon changes occurring (such as new notifications or new unaddressed events, dismissed notifications (or addressed events corresponding to the notifications), new contextual information or other user data indicating changes in user availability or changes in urgency or importance, then the potential or pending notifications may be rescored, re-ranked, or otherwise reprioritized, in some embodiments. In some embodiments, notification logic is updated or otherwise generated to reflect the priority.

For example, suppose there are presently four unaddressed events associated with a user: A) a missed call from the user's spouse; B) an unaddressed email from the user's boss; C) a missed event-pattern call to the user's mother (i.e. the user has a pattern of calling her mother at a certain time, but has not done so this time); and D) the user's car insurance is expiring soon. Each of the unaddressed events has associated with it notification content for use in presenting a notification about the unaddressed event, and the notification content includes notification logic. Based on the urgency or importance and/or user availability (or based on user data indicating user behavior and current information or sensed information about the user, contextual information which may include information from other users, such as crowd-sourced data), notification logic is created to indicate propriety of notifications corresponding to the four unaddressed events. In this way, the notifications may be ranked or otherwise prioritized, for example in the order of B, C, D, A.

It should be pointed out that the order in which notifications are presented to a user does not necessarily correspond to a ranking or priority of pending or potential notifications. For example, suppose a user has two unaddressed events: (1) a missed call from his spouse and (2) renewing the user's car insurance, which expires that day. In this example, unaddressed event (2) may be determined to be more important or urgent than unaddressed event (1), because the user's car insurance will expire that day. Thus, unaddressed event (2) may be scored or ranked as having higher priority than unaddressed event (1). However, suppose the user is driving his car. It may be determined that the user is unavailable to handle unaddressed event (2) because the user is not in front of his computer. But the user is available for handling unaddressed event (1) because the user can make a call while driving. Therefore, the user, while driving, may be presented with a notification to return his spouse's call, and may be presented with the notification to renew his insurance later, such as upon determining that the user is at his computer. Alternatively, in an embodiment, notification logic may be updated to reflect that the unaddressed events are re-ranked or re-prioritized based on the user's availability such that, while the user is driving, unaddressed event (1) has a higher priority than unaddressed event (2).

In some embodiments, notification logic may be determined based on user preferences or settings, which may be explicitly provided by a user or inferred from user patterns or settings provided by other users. For example, from the example described above, notification logic could specify not to present a notification between 6:00-7:00 PM because the user is very unlikely to respond during this time (perhaps because the user is eating supper). In this way, some embodiments of the invention are adaptive and can learn from user responses or user settings. Similarly, a user could tune a notifications setting associated with a personal assistant application or service so that only the most important or urgent unaddressed events are brought to the user's attention during certain times (such as during meetings or in the middle of the night). For example, in one embodiment, a user can specify notification settings based on the category of the unaddressed event, the level of urgency or importance (such as by specifying a threshold, as described previously), availability, or other contextual information.

In some embodiments, notification logic may include content for querying the user to determine user preferences. For example, the user could be prompted with options to determine when to be reminded of unaddressed events or certain categories of unaddressed events, such as this prompt: "Remind me when Personal Assistant application determines is the best time within (a) the next 3 hours; (b) the next 24 hours; (c) the next week; (d) Remind me anytime whether or not it is convenient; (e) Remind me anytime but only when Personal Assistant application determines it is convenient."

Continuing with FIG. 2, some embodiments of events monitor 280 and notification engine 260 use statistics and machine learning techniques. In particular, such techniques may be used to determine pattern information associated with a user, such as event patterns, user response patterns, certain types of events, user preferences, as well as unaddressed events, urgency, importance, user availability, and other notification content associated with the unaddressed events. For example, using crowd-sourced data, embodiments of the invention can learn to associate keywords or other context features (such as the relation between the contacting entity and user) with higher levels of importance or urgency, based on determining how other users respond or react to an event where those keywords or context features are present. In one embodiment, pattern recognition, fuzzy logic, clustering, or similar statistics and machine learning techniques are applied.

Example system 200 also includes a presentation component 218 that is generally responsible for presenting notifications and related content to a user, based on the notification content determined by notification engine 260. Presentation component 218 may comprise one or more applications or services on a user device, across multiple user devices, or in the cloud. For example, in one embodiment, presentation component 218 manages the presentation of notification content to a user across multiple user devices associated with that user. Based on notification logic and user data, presentation component 218 may determine on which user device(s) a notification is presented, as well as the context of the presentation, including how (or in what format and how much content, which can be dependent on the user device or context) it is presented, when it is presented, and what supplemental content is presented with it. In particular, in some embodiments, presentation component 218 applies notification logic to sensed user data and contextual information in order to determine the presentation of notifications.

In some embodiments, presentation component 218 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, presentation component 218 may query the user regarding the importance, urgency, or user preferences for handling an unaddressed event, such as asking the user "Keep showing you similar notifications in the future?" or "Please rate the importance of responding to this event from 1-5 . . . ." Some embodiments of presentation component 218 capture user responses to notifications or user activity associated with notifications and provide this information to event response analyzer 288.

As described previously, in some embodiments, a personal assistant service or application operating in conjunction with presentation component 218 determines when and how to present the notification. In such embodiments, the notification content may be understood as a recommendation to the presentation component 218 (and/or personal assistant service or application) for when and how to present the notification, which may be overridden by the personal assistant app or presentation component 218.

Further, some embodiments of presentation component 218 include functionality for managing pending notifications for a user and may prioritize which notifications are presented, based on urgency or importance, user availability, user preferences, or other contextual information. Alternatively, in other embodiments, notification engine 260 or a notifications service or application manages pending notifications for a user and may prioritize which notifications are presented. In some instances, notifications may be presented individually or grouped and presented together, such as by similar importance, urgency, context, or user availability (for example, unaddressed events that require only placing phone calls may be presented together to a user upon the user starting his car). Thus, notifications of the same or similar types can be aggregated, and in some cases prioritized, in some embodiments. Using the previous example, after starting his car, presentation component 218 may tell the user "You need to call your friend Joe and your mom. Which one do you want to call?"

In an embodiment, notifications can be presented to a user as a to-do list. For example, on Friday after work, presentation component 218 (or a personal assistant service) might tell the user about pending unaddressed events related to the user's friends or family But on Monday morning, it tells the user about pending unaddressed events related to work.

Example system 200 also includes storage 225. Storage 225 generally stores information including data, computer instructions (e.g., software program instructions, routines, or services), and/or models used in embodiments of the invention described herein. In an embodiment, storage 225 comprises a data store (or computer data memory). Further, although depicted as a single data store component, storage 225 may be embodied as one or more data stores or may be in the cloud.

In an embodiment, storage 225 stores one or more user profiles 240, an example embodiment of which is illustratively provided in FIG. 2. Example user profile 240 may include information associated with a particular user or, in some instances, a category of users. As shown, user profile 240 includes event(s) data 242, event pattern(s) 243, event response model(s) 244, availability model(s) 246, user account(s) and activity data 248, and notification(s) 250. The information stored in user profiles 240 may be available to the routines or other components of example system 200.

Event(s) data 242 generally includes information related to events associated with a user, and may include information about events determined my events monitor 280, contextual information, and may also include crowd-sourced data. Event pattern(s) 243 generally includes information about determined event patterns associated with the user; for example, a pattern indicating that the user calls his mom every Sunday. Information stored in event pattern(s) 243 may be determined from event pattern identifier 282. Event response model(s) 244 generally includes response information determined by event response analyzer 288 regarding how the particular user (or similar users) respond to events. As described in connection to event response analyzer 288, in some embodiments, one or more response models may be determined. Response models may be based on rules or settings, types or categories of events, context features or variables (such as relation between a contact-entity and the user), and may be learned, such as from user history like previous user responses and/or responses from other users.

Availability model(s) 246 generally includes the availability pattern information and other information related to user availably determined by availability determiner 264. Additional details of availability models are described in connection to notification engine 260. User account(s) and activity data 248 generally includes user data collected from user-data collection component 214 (which in some cases may include crowd-sourced data that is relevant to the particular user) or other semantic knowledge about the user. In particular, user account(s) and activity data 248 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Embodiments of user account(s) and activity data 248 may store information across one or more databases, knowledge graphs, or data structures.

Notification(s) 250 generally includes data about pending notifications associated with a user, which may include notification content corresponding to one or more unaddressed events. In some embodiments, notification(s) 250 includes data corresponding to notifications that have not yet been presented to a user or supplemental content that may not be provided to a user. (Further, in some embodiments, notification(s) 250 may also include information about previously pending notifications.)

Figure 3:
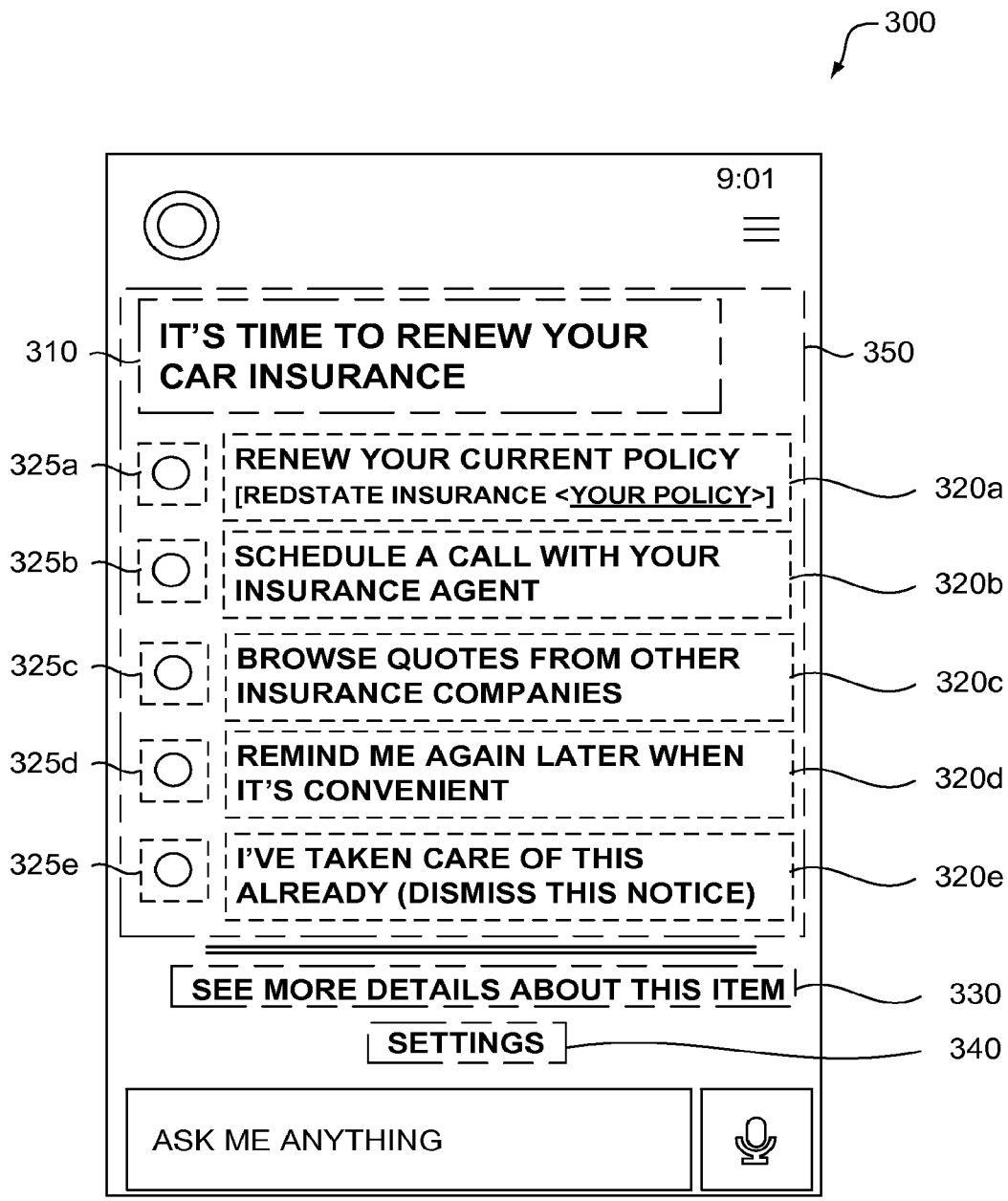
FIG. 3 depicts one example of notification content that may be presented to a user, in accordance with an embodiment of the invention.

Turning now to FIG. 3, an example of a notification generated based on an unaddressed event is described. In this example, the unaddressed event comprises the user needing to renew their insurance policy. FIG. 3 depicts an example user interface of a user device (not shown) having a number of elements for providing content associated with the example notification, and is referenced generally as user interface 300. In this example, user interface 300 comprises a graphical user interface on a user device, such as a smartphone. Example user interface 300 depicts one example of a notification 350 presented to a user in accordance with an embodiment of the invention. The example notification includes a notification message 310 for reminding the user to renew her car insurance.

With continuing reference generally to FIG. 3, notification content may be determined by notification engine 260 and used by presentation component 218 for preparing the example notification 350. In one embodiment, the notification content generated by notification engine 260 may be formatted in a markup language, tagged, or indexed to indicate how specific portions of the content are to be used by presentation component 218. For example, in one embodiment, with regards to notification 350, notification content may include a tagged notification message 310, such as "<NOTICE> It's time to renew your car insurance <NOTICE>." Other portions of notification content may be marked up or tagged in a similar fashion so as to indicate how the notification content data and/or notification logic should be applied.

In an embodiment, notification engine 260 may determine the following information, which may be used for generating notification content corresponding to example notification 350. Here, the determined unaddressed event is that the user needs to renew her car insurance. For this example, suppose there were two missed communication events (which may be detected by unaddressed event detector 284) including an email from the user's insurance company on November 8 and a call from the insurance agent on November 30. Contextual information (including information extracted from the missed communications, or inferred from information extracted from the missed communications) may include, for example: (a) the number of missed communications from an entity associated with the insurance company; (b) the auto insurance policy number and that the insurance company is REDSTATE; (c) that the insurance expires on December 31; (d) that the cost to renew the policy costs $650 for 6 months; and (e) details about the user's car and driving history including where the user lives and works.

The notification content generated by notification engine 260 may include an importance or urgency level associated with the unaddressed event (such as high importance and urgent (or a numeric value such as 9.1 on a scale of 1 to 10)). Here, a determined importance level may remain constant, but an urgency level may increase (which may be specified by notification logic) based on proximity to the expiration date of the insurance policy. The notification content also includes availability information such as the current and forecasted user availability. In this example, supposing the user is eating lunch in a park and has only her smartphone, then one example embodiment of availability information having a corresponding score from 1 to 10 (where 1 is unavailable) may indicate the user's availability—or more specifically, the user's capability for specific activity for addressing the unaddressed event—is as follows: reading email (8), writing email (5), phone calls (10), responding to SMS messages (9), accessing a website (7), reading a document (7), and printing and signing a document (1). Forecasted availability may include information indicating that the user likely will be returning to her office in twenty minutes and will have access to a computer; likely will be driving home from 6:00 to 6:30 PM; that the user sometimes plays games on an Xbox between 7:00 and 9:00 PM; and that the user often responds to email and browses the Internet between 8:00 and 10:00 PM. It should be noted that this is just one example of a portion of the availability information corresponding to an unaddressed event; other embodiments are described in connection with availability determiner 264.

Continuing with the example of car insurance, the notification content generated by notification engine 260 may also include supplemental content. Here, the supplemental content could include, among other things: changes to the user's policy, if the user renews her current policy, quotes from other insurance companies for similar policies (which may be determined by supplemental content generator 266 using contextual information from the user's current policy and user data), contact information and/or website address of the user's current insurance company and the other insurance companies, or other related information that may be potentially helpful such as discounts or rewards that may be available to the user or information from the user's social contacts such as "Your neighbor Bob uses Bluestate Insurance" or "Your Facebook friend Liz likes 'Gecko Insurance,'" for example.

Using notification content including the information described previously, a presentation component (such as presentation component 218) or a personal assistant application or service may generate and provide one or more notices to a user, such as notification 350. Example notification 350 may be provided to a user, if the user's availability indicates the user can interact with the user device. If this is not the case, such as where the user is driving a car, then based on the same notification content, a notification may be generated and presented to the user in the format of a spoken prompt, such as "It's time to renew your car insurance. Do you want to renew your current policy? . . . Do you want me to schedule a call with your insurance agent? . . . " Alternatively, unless the urgency is determined to be very high, the user instead may be presented with a notification for this unaddressed event (renewing car insurance) at a later time when the user's availability indicates the user can at least browse or read information over some user device. In this example, the user may be provided with notification 350 after user data indicates the user is at home, between 8:00 and 10:00 PM, unless the user is playing Xbox. (Or alternatively, where the unaddressed event is determined to have sufficient importance or urgency, the user may be provided a reminder as a pop-up notification on the Xbox graphical user interface.)

With reference to FIG. 3, user interface 300 includes notification 350, and may also include one or more other control options such as item settings control item 340 or see-more-details item 330. Example notification 350 includes a notification message 310 informing the user that "It's time to renew your car insurance policy." Notification 350 also includes user response options 325a-325e and a corresponding description 320a-320e for each response option. The notification response options 325a-325e correspond to one or more tasks or user actions for handling the unaddressed event. (In some embodiments and in some situations, notifications do not include response options.) In this example, response option 325a provides the user with the option of renewing their current policy and includes a link to reference the user's current policy with Redstate insurance. Another response option 325b provides the user with the option of scheduling a call with the user's insurance agent. Upon selecting this response, notification engine 260 may generate notification content for a future notification about this call to be presented to the user at a future time when it is convenient to place this call. Response option 325c provides the user quotes from other insurance companies, which may be determined by supplemental content generator 266 and user data. Response option 325d gives the user the option to dismiss the notification and be reminded later such as at a future time that availability determiner 264 determines is convenient for the user to respond. In some embodiments, where the user selects this option (in response to any notification), current user data and contextual information may be captured and used for determining why the user did not respond to the notification presented at that time, so that future determinations of availably are more precise.

Finally, example response option 325e enables the user to indicate that the unaddressed event has already been handled. In some embodiments, a similar response option may enable the user to indicate "This is no longer relevant to me." As described in connection to response option 325d, in some embodiments, where the user selects this option (in response to any notification), current user data and contextual information may be captured and used for determining how and when the unaddressed event was handled, or why it is no longer relevant to the user, so that future notifications can be tailored for better relevance.

Notifications such as example notification 350 may include one or more control options such as item settings control item 340 or see-more-details item 330. Settings control 340 enables the user to configure settings such as described previously; for example, settings associated with notifications, events to be monitored, sensitivity or thresholds such as when to notify the user, preferred formats for notification, or other user preferences. In some embodiments, settings control item 340 enables a user to view and/or modify the default settings or learned settings. See-more-details item 330 provides feedback information to the user regarding the notification content generated in response to the unaddressed event. For example, here, see-more-details item 330 may include information about the missed email on November 8 and missed call on November 30; urgency, importance, or availability information; sources used for generating supplemental content; or other information related to the notification content.

In some implementations, the specific notification content that is presented to a user may be determined using one or more content templates, or content cards. In particular, a content card can comprise one or more static content fields and/or one or more dynamic content fields. Static content fields correspond to content fields having corresponding content that is displayed each time the content card is presented. Dynamic content fields correspond to content fields having corresponding content that may vary between presentations of the content card. Thus, examples of static content fields might include static content fields 325a-325e in FIG. 3. Examples of dynamic content fields include dynamic content fields 320a-320e.

Figure 4:
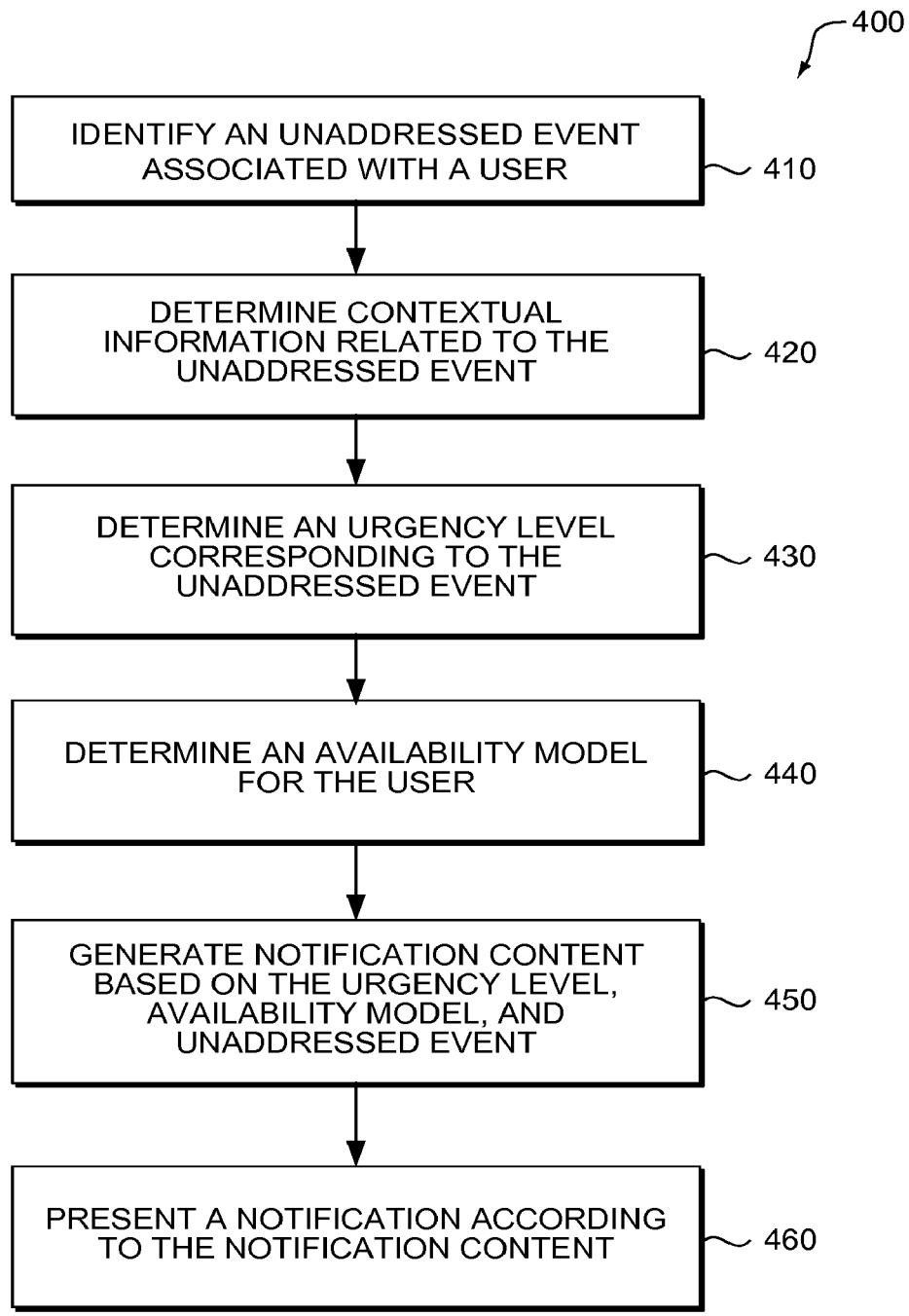
FIGS. 4-6 depict flow diagrams of methods for providing personalized notification content to a user, in accordance with an embodiment of the invention.

Turning now to FIG. 4, a flow diagram is provided illustrating one example method 400 for providing to a user personalized notification content regarding an unaddressed event. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 410, an unaddressed event is identified. As described herein, an unaddressed event may refer to a communication-related event or other event that a user has not responded to, handled, or otherwise addressed. Embodiments of step 410 may detect an unaddressed event based on monitored events data, user data or other sensor data, event patterns, and/or response information such as described herein. In some embodiments, unaddressed events may be identified by triggering circumstances, such as an unanswered incoming call, that are likely indicative of an unaddressed event. In some embodiments, unaddressed events may be determined by analyzing typical user response patterns to similar events. The user response patterns may be compared to current or recent user-activity data in order to determine whether the user has (or is) likely responded to a particular event. In some embodiments, step 410 may be carried out by an unaddressed event detector component, such as described in FIG. 2. Further details of identifying an unaddressed event are provided in connection with unaddressed event detector component 284 in FIG. 2.

At step 420, contextual information related to the unaddressed event is determined. Contextual information may include context features or variables associated with an event, a response, or user activity following an event (which may be indicative of user response activity), and may be determined from user data (or sensor data) or pattern information determined from the user data. In some embodiments, this includes user data from a plurality of users.

In an embodiment, step 420 includes receiving user data and parsing the user data in some instances, and identifying and extracting a set of context features or variables, which may include keywords. In some embodiments, contextual information may also include data inferred from user data and/or confidence scores, variance scores, or probabilities associated with the unaddressed event identified in step 410, such as a likelihood that the event is unaddressed. In some embodiments, step 420 may be carried out by a contextual information extractor, such as described in FIG. 2. Further details of determining contextual information are provided in connection to contextual information extractor 286 in FIG. 2.

At step 430, an urgency level corresponding to the unaddressed event is determined. In some embodiments, the urgency level comprises an importance level or includes information corresponding to urgency of the unaddressed event and importance of the unaddressed event, and may be embodied as a score or numerical value. Embodiments of step 430 may determine an urgency level based on contextual information determined in step 420, response information from the user or other similar users, other related unaddressed events, or other user data or pattern information determined from the user data, as described in connection to urgency/importance determiner 262 in FIG. 2.

Some embodiments of step 430 comprise determining an urgency level based on responses of the user or other users to events similar to the unaddressed event determined in step 410. Similar events may be determined based on variables or context features (determined from step 420) in common among the events. In this way, such embodiments of method 400 (via step 430) can learn to associate context features with urgency or importance based on the responses to similar events. Some embodiments of step 430 further include a probability or confidence associated with the urgency level determined in this step, and which may be used for prioritizing notifications presented to a user, in some situations.

In some embodiments of step 430, a previously determined urgency level may be updated by step 430 based on determined changes in contextual information, user response information, newly detected user patterns, newly identified unaddressed events related to an already identified unaddressed event determined in step 410, or other user data. For example, where the unaddressed event is associated with a deadline, the urgency level corresponding to the unaddressed event may increase as the deadline approaches. Similarly, a missed call from a boss following an unresponded-to email from the boss may indicate a higher urgency level for responding to the email. In some embodiments, step 430 may be carried out by an urgency/importance determiner component, such as described in FIG. 2. Further details of determining an urgency level are provided in connection to the urgency/importance determiner 262 described in FIG. 2.

At step 440, an availability model is determined for the user for addressing the unaddressed event identified in step 410. Embodiments of step 440 determine one or more availability models for a user based on the urgency level determined in step 430 and in some embodiments based on contextual data determined in step 420, and user data (or sensor data) or pattern information determined from the user data, including user data from other users, in some embodiments. The availability model may include current user availability and/or forecasted availability for responding to the unaddressed event, and may comprise a set of availability scores based in part on the user's capability for carrying out actions or tasks associated with responding to the unaddressed event. In some embodiments, the availability model represents inferred user availability information based on when a user is most likely to respond to a notification about a particular event. Moreover, a previously determined availability model for a user may be updated by step 440 based on determined changes in contextual information or user data, including based on updates to the urgency level or importance level determined in step 430.

In some embodiments of step 440, an availability model is determined based on a likelihood that a user will follow one or more user patterns. User capabilities for carrying out actions or tasks within these user patterns may be determined based on the user's (or other users') activity detected during previous instances of these patterns. In some embodiments, step 440 may be carried out by an availability determiner, such as described in FIG. 2. Further details of determining an availability model are provided in connection to the availability determiner 264 described in FIG. 2.

At step 450, notification content is generated based on the urgency level, availability model, and the unaddressed event. In some embodiments, the notification content also may be generated based on contextual information determined in step 420. The notification content may be used for generating and/or providing a notification to the user at a future time determined likely to be more convenient for the user to respond to the unaddressed event and/or where the user likely will have the capacity to respond appropriately, and in some cases may include providing additional content relevant to assisting the user in addressing the event. Moreover, in some cases, the notification content may specify one or more formats for notifications (i.e., how notification(s) may be provided to the user) and the timing of the notification presentation, which may be determined based on context information associated with the unaddressed event including, for example, the importance or urgency. In some embodiments, step 450 may be carried out by a notification engine component, such as described in FIG. 2. Further details regarding generating notification content in step 450 are provided in connection to notification engine 260 in FIG. 2 and the example described in connection to FIG. 3.

In some embodiments, the notification content generated in step 450 includes notification logic. Notification logic may be generated based on the availability determined in step 440, the urgency or importance of the unaddressed event determined in step 430, or other user data, such as current user information or contextual information determined in step 420. Notification logic may specify rules, conditions, constraints, times (including future times or time windows), priority with regards to other notifications, and/or other parameters for notifying the user of the unaddressed event, the content to be included in notifications, as well as logic specifying or recommending formats for presenting notification(s). Further, in some embodiments, notification logic may be determined from user preferences or determined patterns, as described herein, such as logic specifying not to present a notification in the middle of the night, unless the importance exceeds a user-specified level. Additional details regarding notification logic are provided in connection to notification logic generator 268 in FIG. 2.

In some embodiments, the notification content may include supplemental content for assisting the user in addressing the unaddressed event. As described herein, supplemental content may include helpful information, such as relevant contextual information; information from other data sources; hints or tips, which may be based on information derived from other users' responses to similar events; recommendations or suggestions; and/or the actions or steps needed to be taken by the user in order to address the event. In some cases, supplemental content may also include information about actions already taken by the user towards completing the unaddressed event and/or what steps remain to be completed. In some embodiments, supplemental content may be determined based on a semantic understanding, using keyword and pattern analysis, of contextual information of the unaddressed event determined in step 420 and response information from the user's previous responses or from other users responding to similar events, which can include user activity history (e.g., browsing history, actions taken, etc.) of other users responding to similar events. Additional details regarding supplemental content are provided in connection to notification logic generator 268 in FIG. 2.

At step 460, a notification is presented to a user according to the notification content generated in step 450. In embodiments of step 460, a notification about the unaddressed event and related content may be provided to a user, based on the notification content. Embodiments of step 460 may be carried out by a presentation component, such as presentation component 218 described in FIG. 2. In some embodiments, step 460 comprises generating a notification based on information provided in the notification content, including information about the unaddressed event, urgency level or importance level of the unaddressed event, and user availability associated with the unaddressed event. Further, a notification may be generated based on notification logic provided in the notification content and may include supplemental content provided in the notification content. Some embodiments of step 460 comprise communicating notification content to one or more user devices wherein an application or service uses the notification content to generate and present the notification. Alternatively, in some embodiments, notification content may be generated in step 450 on a user device and presented in step 460 on the user device.

In some embodiments, based on notification logic and user data, step 460 may determine on which user device(s) a notification is presented, as well as the context of the presentation, including how (or in what format and how much content, which can be dependent on the user device or context) it is presented, when it is presented, and which (or how much) supplemental content should be presented with it. In particular, some embodiments of step 460 apply the notification logic to sensed user data and contextual information in order to determine notifications and their presentation.

Some embodiments of step 460 also include generating user interface features associated with the notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, or prompts. Furthermore, some embodiments of step 460 capture user responses to notifications or user activity associated with the presented notification for use in further personalizing future notifications provided to the user. Additional details regarding presenting a notification in step 460 are provided in connection to presentation component 218 and notification engine 260 in FIG. 2 and the example described in connection to FIG. 3.

Figure 5:
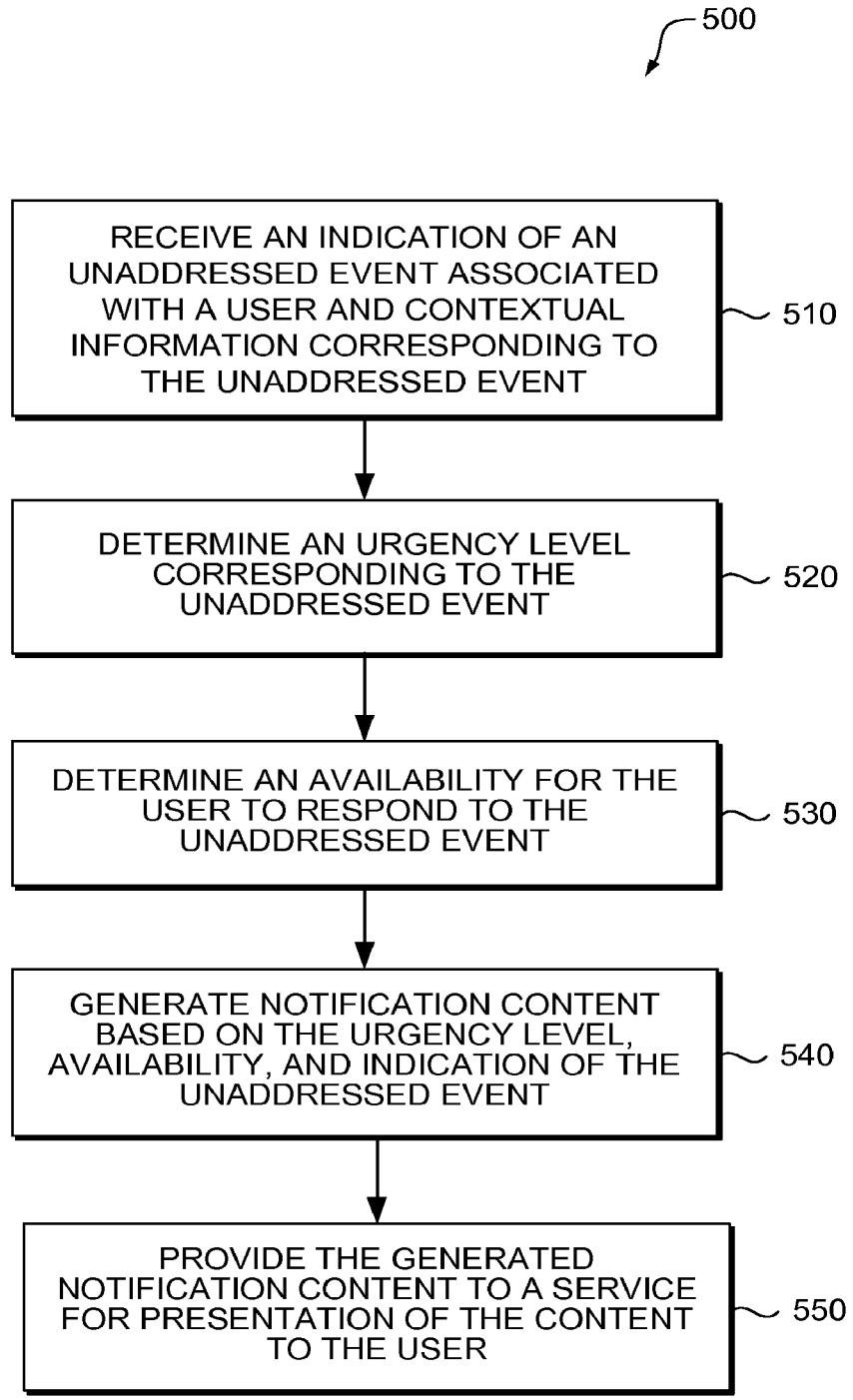

With reference now to FIG. 5, a flow diagram is provided illustrating one example method 500 for providing personalized notification content to a user regarding an unaddressed event. At step 510, method 500 includes receiving an indication of an unaddressed event associated with a user and contextual information corresponding to the unaddressed event. For example, the indication and contextual information may be received from an events monitor 280 (FIG. 2), which may be running as a cloud service on a cloud or could be a local service on a user device. At step 520, method 500 includes determining an urgency level corresponding to the unaddressed event indicated in step 510. Embodiments of step 520 may be carried out as described in step 430 of method 400 (FIG. 4). For example, urgency/importance determiner 262 may determine an urgency level and/or an importance level based on contextual information received in step 510.

At step 530, method 500 includes determining availability for the user to respond to the unaddressed event indicated in step 510. Embodiments of step 530 may be carried out as described in step 440 of method 400 (FIG. 4), wherein one or more availability models are determined for the user. In some embodiments, the availability in step 530 may be determined as described in connection to availability determiner 264. In embodiments of step 530, the determined availability may include current user availability and/or forecasted availability for responding to the unaddressed event, and in some embodiments may comprise a set of availability scores or other information corresponding to the user's capability for carrying out actions or tasks associated with responding to the unaddressed event.

At step 540, method 500 includes generating notification content based on the urgency level, availability, and indication of the unaddressed event. Embodiments of step 540 may be carried out as described in step 450 of method 400 (FIG. 4). At step 550, method 500 includes providing the notification content generated in step 540 to a service for presentation of the content to a user. In particular, a service running on a user device that receives the notification content provided in step 550 may present a notification. The presentation of the notification may be based on information in the notification content, such as notification logic, other user data, and characteristics of the particular user device.

For example, a cloud service may provide the aforementioned out of notification content to the service, which may be external to the cloud system comprising the cloud service. The service could be a third-party service and may be running on user device 102*a*. More particularly, the service could be an application, such as a notification application, a scheduler or calendar application, a communication application, or another type of application, or app. The application may incorporate an API for communication with the cloud service. This may include requesting the data, and/or requesting one or more portions of the data. As an alternative to requesting, at least some of the data could be pushed to the application, for example, as unaddressed events are detected. The application may subscribe to receive these push messages. The API may further provide functions for interpreting the received data (e.g., the recommended actions and contextual information), and possibly for at least partially assisting the presentation of the content.

Further, although step 550 references a single service, the same or different notification content can also be provided to other services. Thus, each service can receive notification content based on an unaddressed event without having to separately perform steps 510 through 540 of method 500. In some cases, some of those other services may be on the same user device. Moreover, where the step 550 is carried out by a server, in some cases, the information need only be sent to a user device once to be used by multiple services on the user device.

In some cases, the same cloud system and/or cloud service may be utilized to perform method 500 so as to provide notification content to multiple services, which may be running on many different user devices. As such, system 200 can save significant processing, bandwidth, storage, and computing resources by centralizing the event monitoring functionality. For example, user-data collection component 214 can accumulate user data and interpretive data for multiple users, such that each user device does not require separate and redundant data collection and storage. Additionally, the processing and storage user profile data can be made more secure by being disassociated from the user device, which is closely tied to the user.

Figure 6:
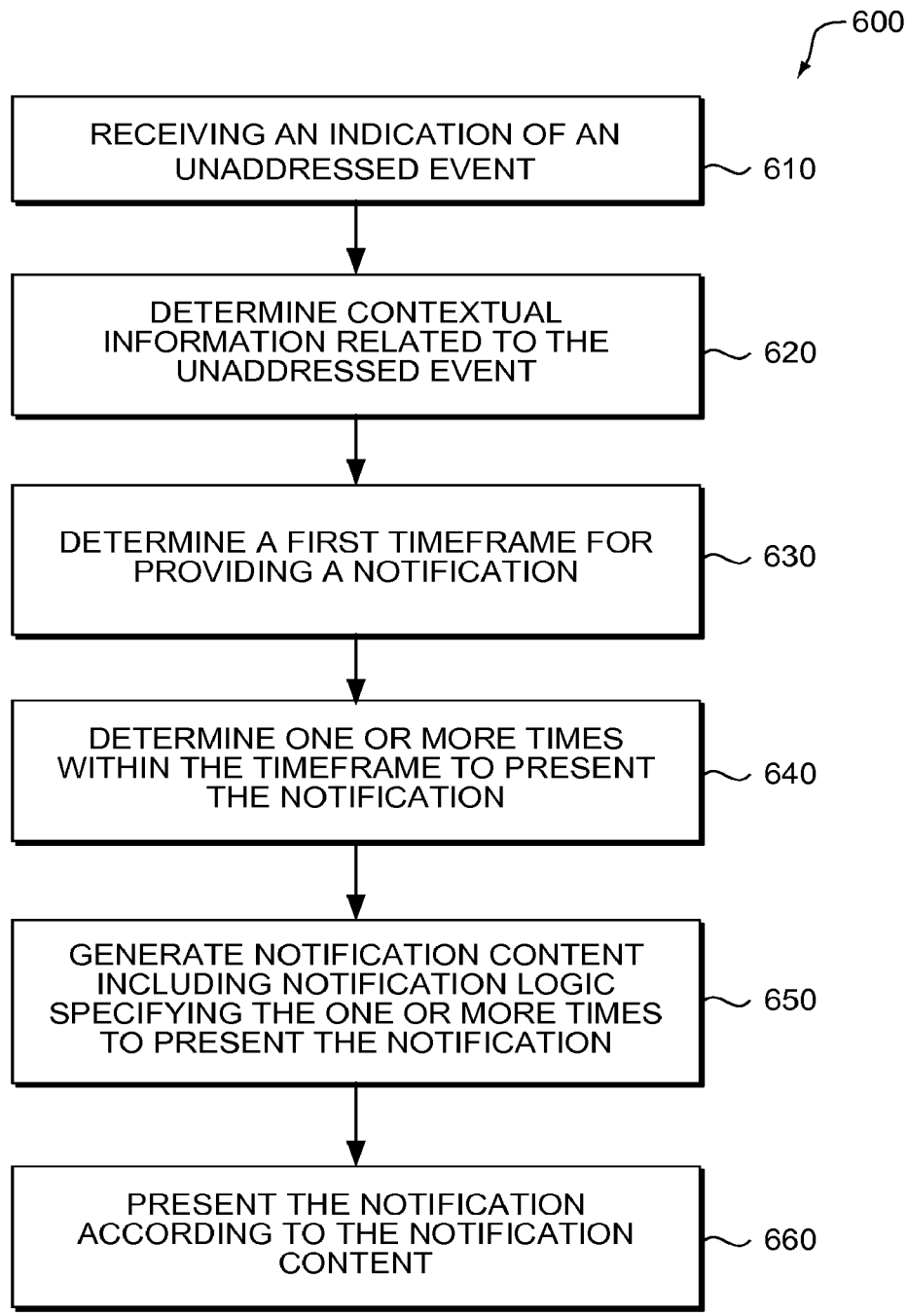
Figure 7:
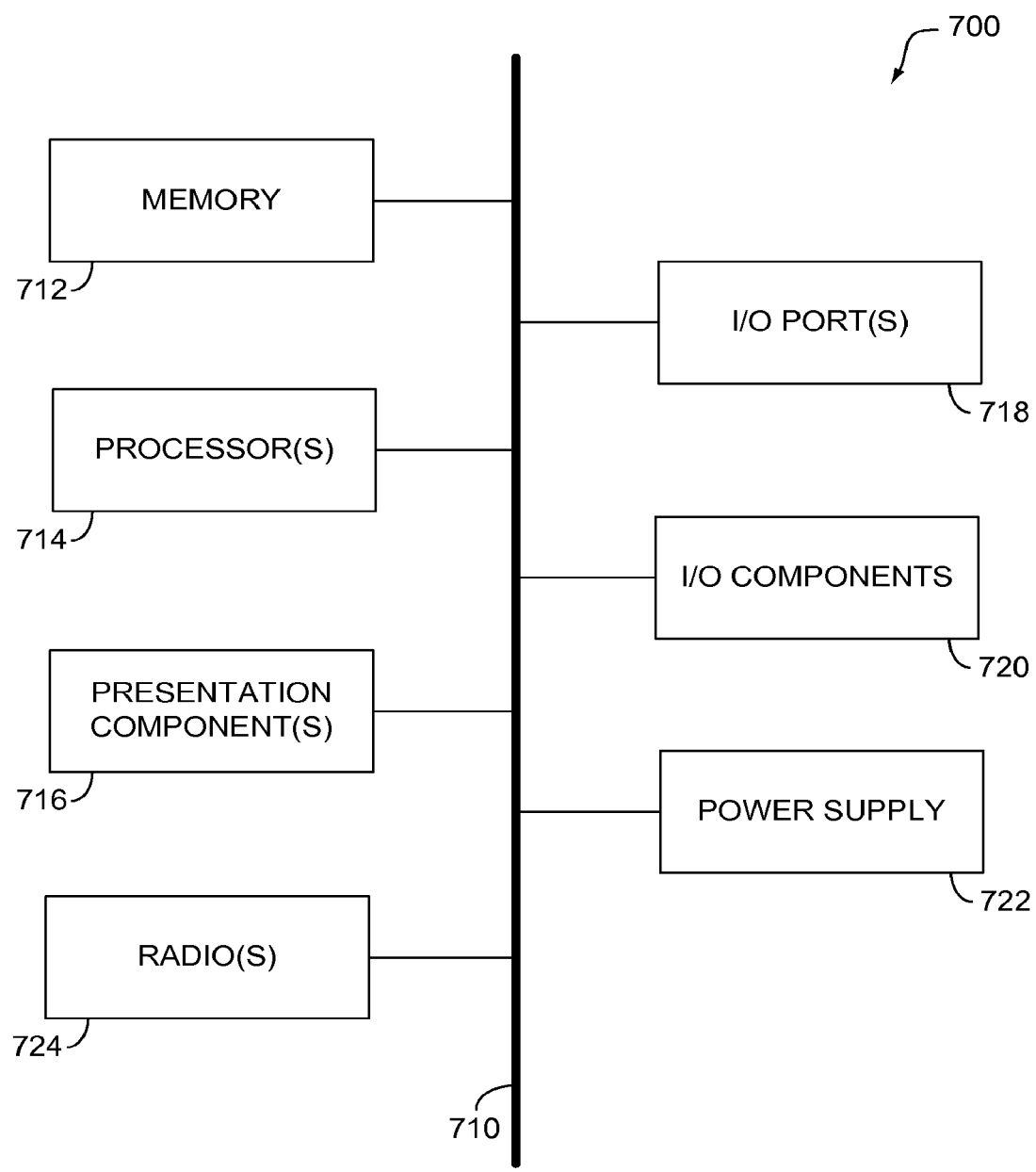
FIG. 7 is a block diagram of an exemplary computing environment suitable for use in implementing an embodiment of the invention.

Turning now to FIG. 6, a flow diagram is provided illustrating one example method 600 for providing to a user personalized notification content regarding an unaddressed event. At step 610, an indication of an unaddressed event is received. The indication may be received from events monitor 280 and may be received using a notification engine 260, such as described in FIG. 2, in an embodiment. The unaddressed event may be determined based on monitored events data, response information, and/or user data or other sensor data, which may be provided by user-data collection component 214 and which may include information sensed or determined from one or more data sources (e.g. data sources 104*a*-104*n* in FIG. 1) including user data and/or crowd-sourced information. In some embodiments, events monitor 280 may identify the unaddressed event using an unaddressed event detector 284, such as described in FIG. 2. Moreover, some embodiments of step 610 may be carried out as described in step 410 of method 400 (FIG. 4). At step 620, contextual information related to the unaddressed event is determined. Embodiments of step 620 may be carried out as described in step 420 of method 400 (FIG. 4).

At step 630, a first timeframe is determined for providing a notification to the user regarding the unaddressed event. The first timeframe may comprises to a span or duration of time, such as a certain number of minutes, hours, days, etc., and may be determined based on the contextual information determined in step 620. In some embodiments, the first time frame is determined based on an urgency or importance corresponding to the unaddressed event, which may have been determined at least in part based on the contextual information. The urgency or the importance of the unaddressed event may be determined using an urgency/importance determiner 262 as described in FIG. In some embodiments, urgency or importance may be determined as described in step 430 of method 400 (FIG. 4).

In some embodiments, the first timeframe corresponds to a span of time in which it is likely that the user would desire to be notified of the unaddressed event. For example, where contextual information indicates that a particular unaddressed event is urgent, then the timeframe may be a shorter span or duration. The span of time may be a future time interval or may be a time interval starting at the present time and lasting until some point in the future. Where the unaddressed event has a time limit or deadline, such as renewing car insurance, then the timeframe may be determined to end upon the deadline.

In some embodiments, the time frame may also be determined based on the user's availability or user schedule information, such as described in connection with the availability determiner 264 of FIG. 2. For example, where the user is awake during the day a first timeframe may be determined as the next three hours. But where the user is sleeping, the first time frame may be determined to be from 7:30 to 10:30 AM or the first three hours the user is awake, once sensor information from user-data collection component 214 indicates that the user is awake.

At step 640 one or more times, within the first timeframe determined in step 630, are determined for presenting the notification to the user regarding the unaddressed event. The one or more times may be specific points in time (e.g. 3:59 PM) or ranges or spans of time and may be specified conditionally. For example, a first time in the one or more times could be specified as between 7:30 and 8:00 AM (such as when the user drives to work) and a second time could be specified as between 5:30 and 6:00 PM (such as when the user is driving home). As another example, a first time from the one or more times could be the first 15 minutes after it is determined that the user has arrived home from work in the evening. Accordingly, in some embodiments, step 640 comprises determining a specific future time for potentially presenting a notification to the user regarding the unaddressed event. It may be "potentially presented" because conditions may not be met or sensor data may indicate that the user's availability has changed and thus a notification should not be presented at that time. (In this instance, the notification may be presented at a second time in the one or more times, if a second time has been determined.)

In some embodiments of step 640, the one or more times are determined based on the user's availability, which may be determined from an availability model as described in step 440 of method 400 (FIG. 4). The number of specific times determined of the one or more times may be based on the size of the timeframe determined in step 630 and the user's availability. For example, if the timeframe is short and the user is only available for responding to the unaddressed event for a small portion of the timeframe, then only one specific time in step 640 may be determined. But where the timeframe is longer and within the timeframe the user likely has availability at more than one time, then multiple times may be determined in step 640. Moreover, in some embodiments, the one or more times determined in step 640 may be updated based on sensed or determined changes in the user's availability and/or determined changes in urgency or importance of the underlying unaddressed event.

At step 650, notification content is generated for use in presenting a notification regarding the unaddressed event. The notification content includes notification logic specifying the one or more times determined in step 640 for potentially presenting the notification. In some embodiments, the notification content is generated using notification engine 260 and the notification. The notification logic may also include additional logic such as conditions for presenting the notification or other logic as described in connection to notification logic generator 268 of FIG. 2. Additional aspects of generating notification content contemplated for use in step 650, including, for example, using contextual information, supplemental content, and notification formats, are described in connection to step 450 of method 400 (FIG. 4).

At step 660 a notification is presented to a user according to the notification content generated in step 650. Embodiments of step 660 may be carried out as described in step 460 of method 400 (FIG. 4).

In some embodiments, method 600 includes determined a second timeframe or additional timeframes. For example, in some cases where a user has not responded to a notification during the first timeframe and the corresponding unaddressed event is still pending and relevant (i.e. it hasn't expired), then a second timeframe may be determined. Similarly, where the user has asked to be reminded or notified again about an unaddressed event (such as described in connection to item 320*d* in FIG. 3), then a second timeframe may be determined. (Alternatively, in some embodiments a second time of the one or more times determined in step 640 may be used for re-presenting the notification to the user.) The second timeframe may be determined as described in step 630 for determining the first timeframe. In some embodiments, where the second (or additional) timeframe is determined and the first (or previously determined) timeframe is still pending, the second timeframe may supersede the first timeframe.

With reference now to architecture 100, system 200, and methods 400, 500 and 600 (FIGS. 1-2 and 4-6), several additional examples are described for providing personalized notification content to a user regarding an unaddressed communication-related event. These examples may be carried out using various embodiments of the invention described herein. In a first example, John receives an email from his boss. He clicks on or opens the email. (His email software marks it as "read.") But he plans to read it and respond later on, and he forgets. An embodiment of the invention identifies that John always responds to emails from his boss but hasn't responded this time. A reminder about the email is presented to John.

In a second example, a user has a pattern of calling his parents while he drives home from work. During the workday, the user misses a call from his sister Liz. Because the user has a pattern of calling while driving, and also calling family members (his parents) after work, upon starting his car on the way home from work, an embodiment of the invention may present a notification (via an audible announcement) that his sister Liz called during the day, and ask the user if he wants to call Liz or call his parents now? Further, upon completing the first call (to his parents or to Liz), an embodiment of the invention may determine how much time is left during the drive and, if there is sufficient time, may ask the user if he wants to call the other family member(s). For example, if the user called his sister first, he may be then asked if he wants to call his parents now. Whether there is sufficient time may be determined based on user data including commuting time patterns for the user, current traffic information, and/or based on other contextual data such as the location of the user's home and average call durations to his parents and sister. If there is likely insufficient time, then the user may be presented with a reminder to call the other party at the next time it is determined to be convenient or according to an availability model for the user.

In a third example, Michelle missed a call from her husband and hasn't called him back. Other user data and contextual information indicates that she has not communicated with him in other ways and that she and her husband are not at the same location. At a first future time, when it is determined to be convenient based on Michelle's availability and any determined urgency or importance associated with the missed call, a reminder is provided to Michelle to call her husband. After a time interval, when it is determined that Michelle still has not contacted him, a second reminder is provided to Michelle at a second future time that may be determined to be convenient like the first future time. In some cases, the second reminder may be more noticeable (e.g., larger such as a pop-up instead of a notification bug, include an audible chirp, etc.). Alternatively, Michelle may be presented with the notification as soon as she attempts to access the phone functionality on her user device. For example, as soon as she launches the phone app on her smartphone, she is shown a prompt telling her that her husband called and asking if she wants to return his call now.

In a fourth example, Bill notices that his wife called two times during a meeting. However, when Bill leaves the meeting, he gets into an interesting discussion with two of his colleagues and forgets to call back his wife. An embodiment of the invention determines that Bill is not in a meeting anymore and further determines that he usually calls back his wife in similar situations. So a notification is generated reminding him to call her back and provided to Bill via his smartphone. If user data (or sensor data) indicates that Bill's smartphone is in his pocket, then the notification may include a vibration or sound to attract Bill's attention. (For example, the notification content may include notification logic for this condition.)

Continuing this example, each time Bill's wife called (or each time she calls within a given timeframe), a determined urgency associated with the missed calls from his wife may be increased. If the urgency is high enough, Bill may be notified of the unaddressed event (i.e., a communication from his wife) during the meeting. For example, where she calls three times and also sends a text message such as "Bill, please call me ASAP. It's an emergency" then an urgency level may be updated, and if it is great enough (which may be determined by a threshold as described herein), then Bill will be presented with a notification during the meeting. Some embodiments may also consider contextual information about the importance of the meeting that Bill is attending. For example, where contextual information, which may be determined from a meeting request, calendar, or email, indicates that the meeting is with Bill's boss regarding his compensation, then a higher level of urgency may be required in order to interrupt the meeting with a notification.

In a fifth example, James missed a call from the phone company reminding him to pay his phone bill. A personal assistant application (an embodiment of the invention) detects the missed call and using contextual information determines notification content including supplemental content for a notification. The personal assistant application provides a reminder to James at a convenient time that includes a link to pay the phone bill. Alternatively, another embodiment of the personal assistant application may automatically pay the bill and report it to James or may ask James "Do you want me to pay your phone bill now?" (In some embodiments, James may be required to authorize the personal assistant application to make payments on his behalf, which may be implemented as a feature in user settings.)

In a sixth example, George's wife notices that the faucet is leaking and sets a reminder using a personal assistant application, such as "Cortana, George needs to fix the leaky faucet." The personal assistant application provides the reminder to George at a convenient or personalized time when George is likely to be able to address the leak, such as on Saturday morning after George wakes up. Suppose that while driving home from work, sensor data indicates that George stopped by the hardware store. Contextual information corresponding to the unaddressed event and response information may indicate that fixing faucets (or fixing things) is related to user visits to hardware stores. Accordingly, even where it may have been previously determined that George was unavailable on Thursday evening while driving home from work and thus should not be presented with the notification to fix the faucet, George's availability may be updated because he is at the hardware store. Thus George may be presented with a notification about the leaky faucet upon visiting the hardware store.

In a seventh example, the dentist calls Bob to schedule an appointment for his biannual cleaning and check-up. A personal assistant application (an embodiment of the invention) detects the unaddressed event (the missed call) and schedules an appointment with the dentist office at a time convenient to the user. A convenient or available time may be determined based on contextual information and user data, such as the user's calendars and the user's future appointments (which may be determined from emails, texts, or social network data, for example). The personal assistant application may generate an email to the dentist office, which may include times that Bob is available, may schedule an appointment online, or (using automatic speech recognition functionality) may call the office and play a message regarding scheduling an appointment. Once an available time for the dentist appointment is determined, a notification may be presented to Bob to confirm the appointment. Alternatively, the appointment may be automatically scheduled and a notification presented to Bob regarding the appointment.

In an eighth example, Ido has received an email with a coupon for baby food. A personal assistant application (an embodiment of the invention) detects the email and, based on user data including user activity, purchase history, online activity, or the like, determines that Ido has not taken any action regarding purchasing baby food. Contextual information indicates that Ido regularly purchases baby-related products; therefore, the personal assistant application determines that the coupon is likely important (relevant) to Ido. Further, the personal assistant application determines that the coupon expires today, and thus has a high urgency level. Therefore, a notification reminding Ido of the coupon is provided to Ido on his way home from work shortly before he passes the grocery store. (Alternatively, suppose a personal assistant application for another user determines that the user does not have a baby, then the importance level corresponding to the coupon is low and that user probably is not presented with a notification about the coupon.)

Accordingly, we have described various aspects of technology directed to systems and methods for providing personalized notification content to a user regarding an unaddressed communication-related event. It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the present invention in any way, and in fact, the steps may occur in a variety of different sequences within embodiments hereof. Such variations and combinations thereof are also contemplated to be within the scope of embodiments of the invention.

Having described various embodiments of the invention, an exemplary computing environment suitable for implementing embodiments of the invention is now described. With reference to FIG. 6, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 700 includes a bus 710 that directly or indirectly couples the following devices: memory 712, one or more processors 714, one or more presentation components 716, one or more input/output (I/O) ports 718, one or more I/O components 720, and an illustrative power supply 622. Bus 710 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Accordingly, in one aspect, an embodiment of the invention is directed to a computerized system comprising one or more sensors configured to provide sensor data; an events monitor configured to detect an unaddressed event based at least in part on the sensor data; one or more processors; and one or more computer storage media storing computer-useable instructions that, when used by the one or more processors, cause the one or more processors to perform certain operations. These operations include: (a) identifying, using the events monitor, an unaddressed event based at least in part on the sensor data, the unaddressed event being associated with a user; (b) determining, using the events monitor, a set of contextual information associated with the identified unaddressed event; (c) determining an urgency level corresponding to the unaddressed event, based on the set of contextual information; (d) determining an availability model for the user, based at least in part on the determined urgency level corresponding to the unaddressed event; and (e) generating a set of notification content based on the urgency level, availability model, and unaddressed event, the set of notification content for determining a notification regarding the unaddressed event.

In some embodiments of this system, the operations further include determining the notification according to the generated set of notification content, and presenting the notification on a user device associated with the user, the notification presented according to the set of notification content at a future time from when the notification content was generated. In some embodiments, the determined availability model for the user includes future availability for the user and further comprises a set of availability scores corresponding to the user's capability for carrying out actions or tasks associated with responding to the unaddressed event. In some embodiments, generating the set of notification content includes determining a set of notification logic based on the determined urgency level and availability model, the notification logic specifying at least one condition or format for presenting the notification corresponding to the unaddressed event. And, in some embodiments, generating the set of notification content includes determining a supplemental content for assisting the user in addressing the unaddressed event, and the presented notification incudes presenting a portion of the supplemental content.

In another aspect, an embodiment of the invention is directed to a computerized method. The method includes (a) receiving, at a server, one or more network communications comprising: (i) an indication of an unaddressed event associated with a user, the unaddressed event being determined at least in part on sensor data provided by one or more sensors on a user device associated with the user, and (ii) contextual information corresponding to the unaddressed event; (b) determining an urgency level corresponding to the unaddressed event, based on the contextual information; (c) determining user availability for responding to the unaddressed event, the user availability based at least in part on the determined urgency level corresponding to the unaddressed event; (d) generating notification content based on the urgency level, availability model, and unaddressed event, the notification content for determining a notification regarding the unaddressed event; and (e) providing the notification content to a service associated with a user device, the service for presenting the notification to the user based on the notification content.

In yet another aspect, an embodiment of the invention is directed to one or more computer-readable devices having computer-executable instructions embodied thereon that, when executed by a computing system having a processor and memory, cause the computing system to perform a method for providing personalized notification content to a user regarding an unaddressed communication-related event. The method includes (a) identifying an unaddressed event based at least in part on user data from a user device, the unaddressed event being associated with a user; (b) determining contextual information associated with the identified unaddressed event; (c) determining at least one of an urgency or importance corresponding to the unaddressed event, based on the contextual information; (d) determining an availability model for the user, based at least in part on the determined urgency or importance corresponding to the unaddressed event; (e) generating notification content based on the determined urgency or importance, the availability model, and the unaddressed event; (f) determining a notification regarding the unaddressed event according to the generated notification content; and (g) presenting the notification on a user device associated with the user, the notification presented according to the set of notification content at a future time from when the notification content was generated.

In yet another aspect, an embodiment of the invention is directed to a computerized system comprising one or more sensors configured to provide sensor data; a notification engine configured to generate notification content for determining a notification; one or more processors; and one or more computer storage media storing computer-useable instructions that, when used by the one or more processors, cause the one or more processors to perform certain operations. These operations include: (a) receiving, using the notification engine, an indication of an unaddressed event, the unaddressed event being associated with a user and determined based at least in part on the sensor data; (b) determining a set of contextual information associated with the unaddressed event, the contextual information determined based at least in part on the sensor data; (c) based at least in part on the set of contextual information, determining a first time frame for providing to the user a notification regarding the unaddressed event; (d) determining one or more times to present the notification to the user, the one or more times being within the first time frame; and (e) generating a set of notification content for determining the notification, the notification content including notification logic specifying the one or more times to present the notification. In some embodiments of this system, the operations further include determining the notification according to the generated set of notification content, and presenting the notification on a user device associated with the user, the notification presented according to the set of notification content at a particular time from the determined one or more times.

The invention claimed is:

1. A computerized method comprising:
   receiving an indication of an unaddressed event associated with a user, the unaddressed event determined based at least in part on sensor data provided by one or more sensors on one or more user devices associated with the user, wherein the unaddressed event comprises a missed instance of an event in an event pattern associated with the user, a future event that involves user action, or a calendar event;
   determining a user task for completing a response to the unaddressed event;
   determining a historical user-activity pattern for the user from the sensor data;
   determining a likely future activity of the user based at least in part on the historical user-activity pattern;
   determining a future availability of the user for responding to the unaddressed event, based at least in part on determining whether the user is capable of performing the user task during the likely future activity, wherein the future availability of the user indicates whether the user is capable of performing the user task at one or more future times;
   generating notification content regarding the unaddressed event for presentation to the user;
   based at least in part on the future availability of the user, generating notification logic specifying one or more conditions comprising a time, a format, a location, or a mode, for presenting the notification content to the user; and
   providing the notification content for presentation to the user based on the notification logic.

2. The computerized method of claim 1, wherein the notification content is presented on a user device that provided at least a portion of the sensor data.

3. The computerized method of claim 1, wherein the sensor data include recent user activity and user response patterns to events that are similar to the unaddressed event.

4. The computerized method of claim 1, wherein the future availability of the user for responding to the unaddressed event includes an availability for the user over a future time interval indicating a capability of the user for carrying out the user task.

5. The computerized method of claim 1, wherein the user task comprises one or more of placing a call, responding to an email, reading a document, web browsing, or typing.

6. The computerized method of claim 1, wherein the notification logic specifies the time for presenting the notification content to the user.

7. The computerized method of claim 1, wherein the notification logic specifies the format for presenting the notification content to the user.

8. A system comprising:
   one or more processors;
   one or more computer storage devices storing computer-useable instructions that, when used by one or more computing devices, cause the one or more computing devices to perform operations comprising:
   receive an indication of an unaddressed event associated with a user, the unaddressed event determined based at least in part on sensor data provided by one or more sensors on one or more user devices associated with the user, wherein the unaddressed event comprises a missed instance of an event in an event pattern associated with the user, a future event that involves user action, or a calendar event;
   determine a user task needed for a response to the unaddressed event;
   determine a historical user-activity pattern for the user from the sensor data;
   determine a likely future activity of the user based at least in part on the historical user-activity pattern;
   determine a future availability of the user for responding to the unaddressed event, based at least in part on determining whether the user is capable of performing the user task during the likely future activity, wherein the future availability of the user indicates whether the user is capable of performing the user task at one or more future times;
   generate notification content regarding the unaddressed event for presentation to the user;
   based at least in part on the future availability of the user, generate notification logic specifying one or more conditions comprising a time, a format, a location, or a mode, for presenting the notification content to the user; and
   provide the notification content for presentation to the user based on the notification logic.

9. The system of claim 8, wherein the notification content is presented on a user device that provided at least a portion of the sensor data.

10. The system of claim 8, wherein the sensor data include recent user activity and user response patterns to events that are similar to the unaddressed event.

11. The system of claim 8, wherein the future availability of the user for responding to the unaddressed event includes an availability for the user over a future time interval indicating a capability of the user for carrying out the user task.

12. The system of claim 8, wherein the user task comprises one or more of placing a call, responding to an email, reading a document, web browsing, or typing.

13. The system of claim 8, wherein the notification logic specifies the time for presenting the notification content to the user.

14. The system of claim 8, wherein the notification logic specifies the format for presenting the notification content to the user.

15. One or more computer storage devices storing computer-useable instructions that, when used by one or more computing devices, cause the one or more computing devices to perform a method comprising:
   receiving an indication of an unaddressed event associated with a user, the unaddressed event determined based at least in part on sensor data provided by one or more sensors on one or more user devices associated with the user, wherein the unaddressed event comprises a missed instance of an event in an event pattern associated with the user, a future event that involves user action, or a calendar event;
   determining a user task for responding to the unaddressed event;
   determining, from the sensor data, a historical user-activity pattern associated with the one or more user devices;
   determining a likely future activity of the user based at least in part on the historical user-activity pattern;
   determining a future availability of the user for responding to the unaddressed event, based at least in part on determining whether the user is capable of performing the user task during the likely future activity, wherein the future availability of the user indicates whether the user is capable of performing the user task at one or more future times;
   generating notification content regarding the unaddressed event for presentation to the user;
   based at least in part on the future availability of the user, generating notification logic specifying one or more conditions comprising a time, a format, a location, or a mode, for presenting the notification content to the user; and
   providing the notification content for presentation to the user based on the notification logic.

16. The one or more computer storage devices of claim 15, wherein the notification content is presented according to the format determined based on the future availability of the user.

17. The one or more computer storage devices of claim 15, wherein the event pattern is based on user pattern information determined at least in part from a portion of the sensor data.

18. The one or more computer storage devices of claim 17, wherein the sensor data comprise location data of a mobile device associated with the user.

19. The one or more computer storage devices of claim 17, wherein the future availability of the user is determined based at least in part on the user pattern information.

20. The one or more computer storage devices of claim 15, wherein the time for presenting the notification content to the user comprises a duration of time.

* * * * *